United States Patent
Kamada et al.

[11] Patent Number: 6,140,607
[45] Date of Patent: Oct. 31, 2000

[54] GAS SHIELDED ARC-WELDING FLUX CORED WIRE

[75] Inventors: Masao Kamada, Saitama; Rikiya Takayama, Chiba; Takeo Adachi, Kanagawa; Kazuo Mori; Harutosi Kubota, both of Chiba, all of Japan

[73] Assignee: Nippon Steel Welding Products & Engineering Co., Ltd., Tokyo, Japan

[21] Appl. No.: 09/342,621

[22] Filed: Jun. 29, 1999

[30] Foreign Application Priority Data

Apr. 23, 1999 [JP] Japan ................................. 11-116621

[51] Int. Cl.⁷ .................................................. B23K 35/02
[52] U.S. Cl. ............................... 219/145.22; 219/146.3; 148/24; 148/26
[58] Field of Search ........................... 219/145.22, 146.3; 428/552, 558; 148/24, 26

[56] References Cited

U.S. PATENT DOCUMENTS

| | | | |
|---|---|---|---|
| 3,843,867 | 10/1974 | Helton et al. | 219/137 |
| 4,510,374 | 4/1985 | Kobayashi et al. | 219/146.1 |
| 5,099,103 | 3/1992 | Yamada et al. | 219/145.22 |
| 5,219,425 | 6/1993 | Nishikawa et al. | 228/56.3 |
| 5,903,814 | 5/1999 | Miura et al. | 428/552 |

FOREIGN PATENT DOCUMENTS

| | | |
|---|---|---|
| 61-147993 | 7/1986 | Japan . |
| 3-294092 | 12/1991 | Japan . |
| 5-31594 | 2/1993 | Japan . |
| 10-176247 | 6/1998 | Japan . |

*Primary Examiner*—Patrick Ryan
*Assistant Examiner*—M. Alexandra Elve
*Attorney, Agent, or Firm*—Wenderoth, Lind & Ponack, L.L.P.

[57] ABSTRACT

A gas shielded arc-welding flux cored wire having a steel-made sheath filled with flux. The flux cored wire containing, by weight % based on the total weight of the wire, 1.0% or more Si—Mn ferroalloy powder having a grain size of 212 $\mu$m or less; 2.0 to 7.0% $TiO_2$; 0.2 to 1.5% $SiO_2$; 0.1 to 1.2% $ZrO_2$; and 0.01 to 0.3% fluoride (F-converted value). The powder comprises, by weight %, 0.40 to 1.20% C, 5 to 12% Si, 19 to 42% Mn, and the balance of Fe, with Si $2 \geqq 11.89 - 2.92$ C$-0.077$ Mn (Equation (1)) satisfied.

25 Claims, 6 Drawing Sheets

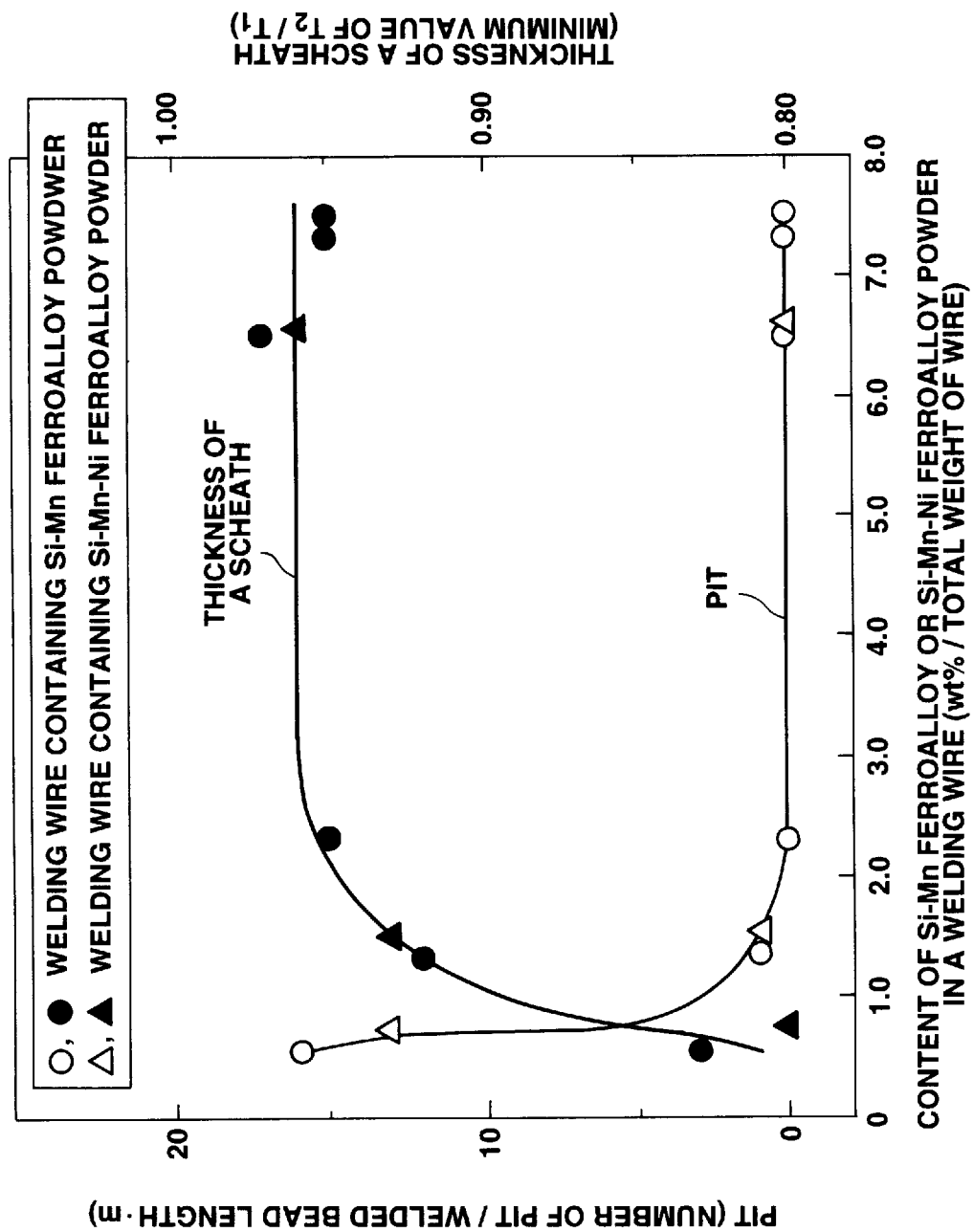

GAS SHIELDED ARC-WELDING FLUX CORED WIRE

BACKGROUND OF THE INVENTION

1. Field of the Invention

The present invention relates to a gas shielded arc-welding flux cored wire (hereinafter also referred to as "the fluxed cored wire") for used in a mild steel, a high strength steel, and a low alloy steel which are used for ships, bridges, steel frames, etc., in particular to a gas shielded arc-welding flux cored wire which has excellent welding usability even when used on a high welding current condition in order to improve the welding work efficiency.

2. Prior Art

There are various flux cored wires used for fillet welding which has been proposed, e.g. in Japanese Publication of unexamined application (Kokai) No. 61-147993 and Japanese Publication of unexamined application (Kokai) No. 3-294092. On this occasion, fillet welding has been demanded to further increase in speed. Also, the flux cored wire used for fillet welding is generally subjected to a measure to prevent pits or worm holes being formed on the bead due to a rust preventive primer applied on a steel structure during its production. However, the high-speed horizontal fillet welding is dramatically affected by the kind, and the thickness of the primer applied on the steel plate, which provides a problem related to resistance to primer. Besides, obtaining a target leg length corresponding to the high-speed of the welding necessarily provides a high electric current welding condition, which provides problems of the bead convexity, comfortable shape of the toe portion, and deterioration of the bead appearance and the slag peeling properties due to undercut and slag seizure.

The all position welding flux cored wires have been most widely used since they can perform the all position welding such as a flat position, a horizontal position, an overhead position, and a vertical position welding; however, they are demanded to prevent the metal running in the vertical position welding and to be available on a wide range welding condition, particularly when used on the high welding current condition. The metal running in the vertical position welding provides such problems of the conformability of the bead toe portion, the bead appearance, and the slag peeling properties.

SUMMARY OF THE INVENTION

It is therefore an object of the present invention to provide a gas shielded arc-welding flux cored wire which has an excellent resistance to primers, shape and appearance of a bead, and slag peeling properties, even when used for high-speed horizontal fillet welding on a high electric current welding condition. The present invention also provides a gas shielded arc-welding flux cored wire which is excellent in various welding usability including resistance to metal running in vertical position welding, when used on a wide range welding condition including a high electric current region The present inventors have made various flux cored wires and then made studies in order to improve the above-mentioned usability which become problems in the high-speed horizontal fillet welding and the vertical position welding on the high welding current condition.

First, not only limiting a slag forming material contents, adding a fluoride, and limiting hydrogen content of the wire, but also stabilizing the arc condition when using the wire on the high welding current condition is important for improving the resistance to primer of the horizontal fillet welding flux cored wire. In other words, if an arc is continued stably during welding, the fused slag comes to the surface and then continuously rapidly retreats rearward due to the arc force, causing a hydrogen gas to be discharged from the fused pool, which prevents the generation of pits or worm holes. On the other hand, the disturbance of the wire fusing condition makes the arc condition unstable, causing the fused slag to retreat undesirably, which increases the frequency of occurrence of the pits on a thick portion of the solidified slag.

Also, systematically adjusting the fluidity of the fused slag and the solidifying temperature as well as maintaining the stable arc condition to maintain the sufficient slag covering properties is important for improving the shape and the bead appearance and the slag peeling properties when used on the high electric current welding condition. Poor slag covering properties provides the bead-protruding undercut, deterioration of the bead appearance due to slag seizure.

Next, stabilizing the arc condition is indispensable for resistance to metal running exhibiting when using the all position welding flux cored wire on the high electric welding condition.

The downward vertical position welding is carried out while maintaining the fused slag above the fused pool by the arc force. Maintaining the stable arc condition causes the fused slag to be pushed upward smoothly and then solidified rapidly, which prevents the metal running. On this occasion, the slag covers the bead as a whole, thereby making the bead into a smooth shape, which has excellent conformability, which eliminates slag seizure and slag inclusion, and makes the slag peeling properties satisfactory. On the other hand, if the arc condition becomes unstable, the fused slag instantaneously runs, which makes the bead shape uneven (not a flat bead), and provides defects due to the slag inclusion and cracks derived from the slag inclusion. Also when increasing the electric current and enlarging the welding condition range for the upward vertical position welding, the arc condition and the slag covering properties have an effect on the metal running, the conformability of the bead toe portion, and the slag peeling properties.

The present inventors have reached the findings that it is remarkably effective to include a predetermined or more amount of Si—Mn ferroalloy powder or Si—Mn—Ni ferroalloy powder which are specifically described below in order to stabilize the arc condition and the slag covering properties which have an important effect on the improvement of the welding usability of the above-mentioned flux cored wire, and further attain the desired end in the flux cored wire having indispensable components of a slag forming material and a fluoride.

The gist of the present invention is given herein below.

(1) A gas shielded arc-welding flux cored wire having a steel-made sheath filled with flux, characterized by containing, by weight % base on the total weight of the wire, 1.0% or more Si—Mn ferroalloy powder having a grain size of 212 $\mu$m or less;

2.0 to 7.0% $TiO_2$;

0.2 to 1.5% $SiO_2$;

0.1 to 1.2% $ZrO_2$; and 0.01 to 0.3% fluoride (F-converted value), the powder comprises, by weight %, of 0.40 to 1.20% C, 5 to 12% Si, 19 to 42% Mn, and the balance of Fe, with $Si \geq 11.89 - 2.92 \, C - 0.077 \, Mn$ (Equation (1)) satisfied.

(2) A gas shielded arc-welding flux cored wire for fillet welding having a steel-made sheath filled with flux, characterized by containing, by weight % base on the total weight of the wire,

- 1.0% or more Si—Mn ferroalloy powder having a grain size of 212 μm or less;
- 2.0 to 5.0% $TiO_2$;
- 0.2 to 1.2% $SiO_2$;
- 0.1 to 1.2% $ZrO_2$; and
- 0.01 to 0.3% fluoride (F-converted value),
  the powder comprises, by weight %, of 0.40 to 1.20% C, 5 to 12% Si, 19 to 42% Mn, and the balance of Fe, with Si a 11.89−2.92 C−0.077 Mn (Equation (1)) satisfied.

(3) A gas shielded arc-welding flux cored wire for fillet welding having a steel-made sheath filled with flux, characterized by containing, by weight % base on the total weight of the wire,

- 1.0% or more Si—Mn—Ni ferroalloy powder having a grain size of 212 μm or less;
- 2.0 to 5.0% $TiO_2$;
- 0.2 to 1.2% $SiO_2$;
- 0.1 to 1.2% $ZrO_2$; and
- 0.01 to 0.3% fluoride (F-converted value),
  the powder comprises, by weight %, of 0.40 to 1.20% C, 5 to 12% Si, 19 to 42% Mn, 30% or less Ni, and the balance of Fe, with Si≧11.89−2.92 C−0.077 Mn−0.062 Ni (Equation (2)) satisfied.

(4) A gas shielded arc-welding flux cored wire for fillet welding having a steel-made sheath filled with flux, characterized by containing, by weight % base on the total weight of the wire,

- 1.0% or more Si—Mn ferroalloy powder having a grain size of 212 μm or less;
- 4.0 to 7.0% $TiO_2$;
- 0.3 to 1.5% $SiO_2$;
- 0.3 to 1.2% $ZrO_2$;
- 0.1 to 1.5% one or two components of (1.5% or less) Al or (0.8% or less) Mg; and
- 0.01 to 0.2% fluoride (F-converted value),
  the powder comprises, by weight %, of 0.40 to 1.20% C, 5 to 12% Si, 19 to 42% Mn, and the balance of Fe, with Si≧11.89−2.92 C−0.077 Mn (Equation (1)) satisfied.

(5) A gas shielded arc-welding flux cored wire for fillet welding having a steel-made sheath filled with flux, characterized by containing, by weight % base on the total weight of the wire,

- 1.0% or more Si—Mn—Ni ferroalloy powder having a grain size of 212 μm or less;
- 4.0 to 7.0% $TiO_2$;
- 0.3 to 1.5% $SiO_2$;
- 0.3 to 1.2% $ZrO_2$;
- 0.1 to 1.5% one or two components of (1.5% or less) Al or (0.8% or less) Mg; and
- 0.01 to 0.2% fluoride (F-converted value),
  the powder comprises, by weight %, of 0.40 to 1.20% C, 5 to 12% Si, 19 to 42% Mn, 30% or less Ni, and the balance of Fe, with Si≧11.89−2.92 C−0.077 Mn−0.062 Ni (Equation (2)) satisfied.

(6) A gas shielded arc-welding flux cored wire having a steel-made sheath filled with flux, as mentioned in any one of the paragraphs (1) to (5), characterized in that the Si—Mn ferroalloy power or the Si—Mn—Ni ferroalloy powder is 1.10 or less in relative magnetic permeability (μ).

(7) A gas shielded arc-welding flux cored wire having a steel-made sheath filled with flux, as mentioned in any one of the paragraphs (1) to (6), characterized by containing 10% or less iron powder base on the total weight of the wire.

(8) A gas shielded arc-welding flux cored wire having a steel-made sheath filled with flux, as mentioned in any one of the paragraphs (1) to (7), characterized by containing 0.007% or less hydrogen content of the wire based on the total weight of the wire.

(9) A gas shielded arc-welding flux cored wire having a steel-made sheath filled with flux, as mentioned in any one of the paragraphs (1) to (8), characterized by containing 0.010% or less nitrogen content of the wire base on the total weight of the wire.

The present invention provides a gas shielded arc welding flux cored wire which has a good resistance to primer, shape and appearance of the bead, and slag peeling properties, even when used for high-speed horizontal fillet welding on the high electric current welding condition, and provides a gas shielded arc welding flux cored wire which is good in various welding usability including the resistance to metal running for the vertical position welding, when used on a wide welding condition including the high welding current region. This results in improvement of the welding work efficiency and the quality of the welded portion.

The above and other objects, features, and advantages of the invention will become more apparent from the following detailed description taken in conjunction with the accompanying drawings.

BRIEF DESCRIPTION OF THE DRAWINGS

FIG. 1 is a view showing the relationship between Si—Mn ferroalloy powder content or Si—Mn—Ni ferroalloy powder content, and a pit occurring state and the uniformity of the thickness of a sheath portion, in a flux cored wire according to the present invention;

DETAILED DESCRIPTION

Si—Mn ferroalloy powder and Si—Mn—Ni ferroalloy powder contained in a flux cored wire according to the present invention have the following effects, and the contents of the components thereof have been limited as stated above, for the following reasons:

A steel-made sheath of the flux-cored wire is generally made of mild steel, containing a low percentage of Si and Mn, which is excellent in wire producing. For this end, the flux filled contains a high compounding ratio of Si and Mn raw material as deoxidizers and alloy materials for ensuring the mechanical properties of the weld metal. For these raw materials are conventionally used metal Si, metal Mn, ferro-silicon, ferro-manganese, silico-manganese, etc. Also, for the Ni-contained flux cored wire for use in high strength steel, steels for low temperature use, etc., ferro-nickel powder and Ni powder are used.

Figure 3A:
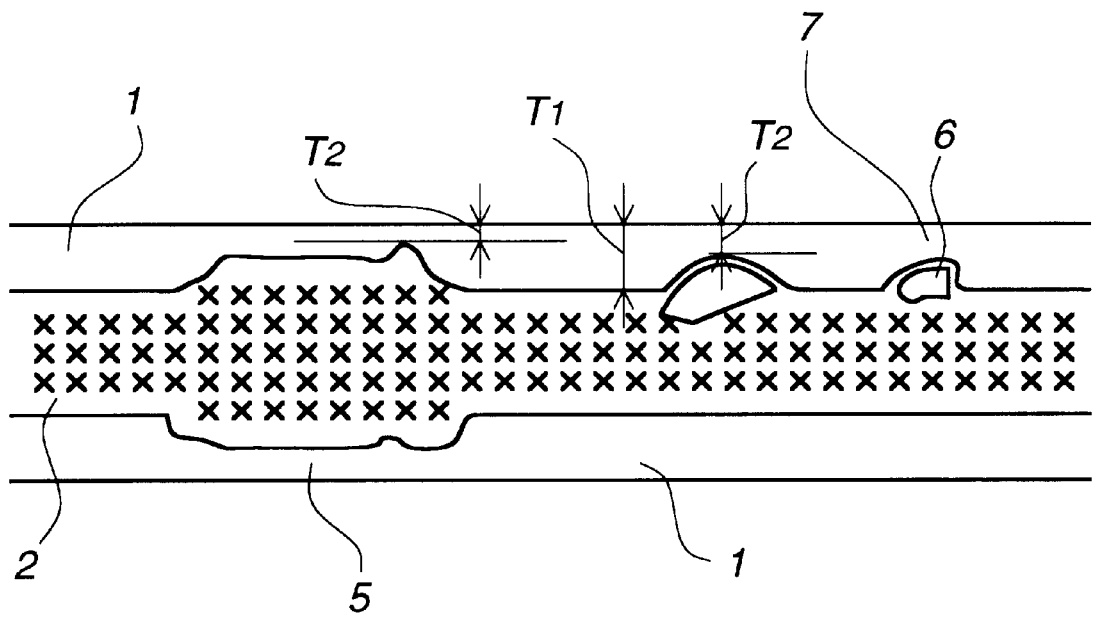
FIG. 3 is a schematic view showing a longitudinal sectional condition example of the flux-cored wire.
Figure 3B:
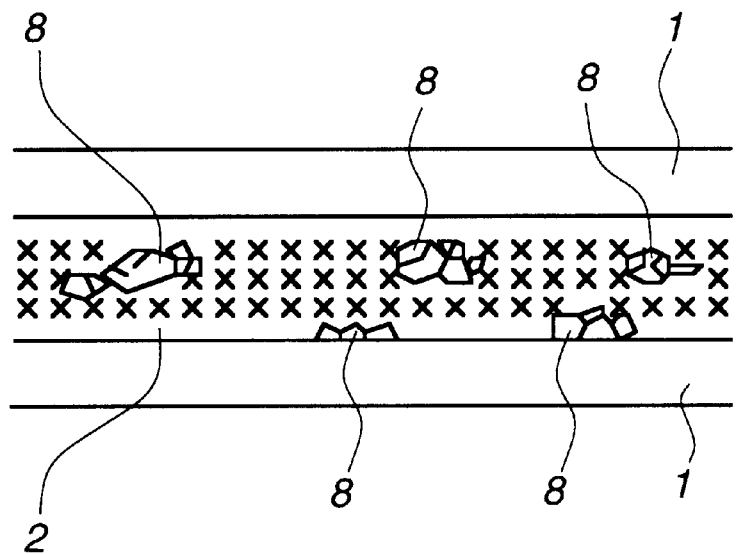

However, according to the observation of the longitudinal section of the flux cored wire, shown in FIG. 3a and FIG. 3b, which contains a large quantity of the above-mentioned metal raw material, a sheath portion 1 has thin portions 5, and bite portions 7 at which flux raw material powders 6 (metal powders, alloy powders) contained in flux 2 are bit into the sheath portion 1, as schematically shown in FIG. 3a with the abnormal portions enlarged. The degree of inequality for the thickness of the sheath portion thus increases causing the wire fusing condition to be, even if the wire contains arc stabilizers, disturbed, thereby disabling the arc condition and the slag covering condition to be maintained stably.

The reason why the thickness of the sheath portion is fluctuated is that the flux portion is continuously applied with a pressing force from the sheath portion with the advance of the drawing work, to thereby be successively compressed and hence become a hardened or strengthened condition, preventing individual grains of the flux material from moving, which makes it difficult for the flux portion to follow the sheath portion extending.

On the contrary, there is schematically shown by a longitudinal sectional view of FIG. 3b a flux filled condition in the flux cored wire according to the present invention. This drawing shows that the degree of uniformity for the thickness of the sheath portion 1 is good and also no flux raw material contained in the flux 2 is bit into the sheath portion 1. Thus, the flux-cored wire is remarkably stable in its arc condition and its slag covering condition.

The thickness of the sheath portion is uniformed by ferroalloy powder in Si—Mn ferroalloy powder or Si—Mn—Ni ferroalloy powder 8 (FIG. 3b), as a flux raw material specified according to the present invention, dispersed in the flux. The Si—Mn ferroalloy powder or the Si—Mn—Ni ferroalloy powder used in the present invention is comprised of having remarkably brittleness ferroalloy powder which is obtained by not only limiting the C content, the Si content, and the Mn content, but also regulating the lower limit of the Si content relatively to the C and the Mn content, or to the C, the Mn, and the Ni content (Equation (1) or Equation (2)). Further, since a grain size is limited to 212 μm or less, the Si—Mn ferroalloy powder or the Si—Mn—Ni ferroalloy powder, when industrially reduced to powder down to such a grain size, undergoes minute cracking at each grain thereof, making easy the grain to be crushed during the drawing work, which enables the thickness of the sheath portion to be effectively uniformed.

In other words, after filling of the flux, the flux portion is generally applied with a pressing force whenever the wire diameter is reduced by a group of dies or a group of rolls. On this occasion, if the raw material is very brittle, the grains cannot resist against the pressing force and are crushed. Further, the respective grains having cracks are good in crushability (property to be crushed); therefore the repeat of the crushing every diameter-reduction makes easy for the ferroalloy powder itself and the flux grains therearound to move, which enables the flux portion to finely follow the sheath portion extending down to a thin diameter.

When the Si—Mn ferroalloy powder or the Si—Mn—Ni ferroalloy powder is comprised of coarse grain size having a diameter exceeding 212 μm, the grains hard to crush may be mixed into the flux and also the grains cannot be sufficiently dispersed into the flux, which reduces the crushing effect in during the drawing work, provides insufficient fluidity of the flux portion, and then easily provides inequality of the thickness of the sheath portion. Moreover, preferably the grains have an optimum diameter which is equal to or less than 212 μm, taking account of a diameter of the finished wire, a grain content of the flux to be filled, and the properties (agglomeration, unagglomeration, bulk density, etc.) of the flux which is to be filled into the sheath.

Further, including the Si—Mn ferroalloy powder or the Si—Mn—Ni ferroalloy powder prevents the segregation of the wire composition to thereby result in an effective improvement of the slag covering properties. In other words, it is recommended to preliminarily prepare the Si—Mn ferroalloy powder or the Si—Mn—Ni ferroalloy powder which simultaneously satisfies the desired Si and Mn content and then use the prepared powder as a raw material, instead of compounding a Si and a Mn powder, which have been conventionally used as a Si and a Mn raw material, with ferro-silicon, ferro-manganese, silico-manganese, etc. combined. This decreases the fluctuation of the flux components in the wire. Further, remarkably decreasing the Si and the Mn content of the Si—Mn ferroalloy powder or the Si—Mn—Ni ferroalloy powder compared with the content of silico-manganese (JIS G 2304-1986) which has been conventionally used, and then limiting the grain diameter to 212 μm or less enables grains, which are low in Si and Mn grade, to be sufficiently dispersed in the flux, which effectively prevents the segregation of the Si and the Mn component. For example, if the Si and the Mn component are segregated in the longitudinal direction of the wire, their deoxidization reaction forms $SiO_2$ and MnO which causes the formation amount and the fluidity of the slag to be partially changed, and degrades the slag covering properties. This causes the shape and, the appearance of the bead, the slag peeling properties, further the resistance to primer to be adversely affected.

Moreover, it is the best that, to prevent the segregation to the utmost, the wire composition contains the Si—Mn ferroalloy powder or the Si—Mn—Ni ferroalloy powder so as to fill all amount of Si, Mn, and Ni required by the flux.

There is shown in FIG. 1 the relationship between the content of the Si—Mn ferroalloy powder or the Si—Mn—Ni ferroalloy powder used in the horizontal fillet welding test of a first embodiment described hereinafter, and the pit occurring state and the uniformity of the thickness of the sheath portion. FIG. 1 shows that including the Si—Mn ferroalloy powder or the Si—Mn—Ni ferroalloy powder in an amount of 1.0% or more resulted in improvement of the uniformity of the thickness of the sheath portion and drastically decreased the number of pits occurring, and at the same time resulted in improvement of the slag covering properties.

(Comparison between test piece Nos. 1 to 7 and Nos. 14 to 15)

In the all position welding flux cored wire also, it was confirmed that including the Si—Mn ferroalloy powder or the Si—Mn—Ni ferroalloy powder in an amount of 1.0% or more resulted in improvement of the usability of high welding current in the all position welding. On the other hand, the content of the Si—Mn ferroalloy powder or the Si—Mn—Ni ferroalloy powder has preferably an upper limit of approx. 10 to 15% or less, taking account of the permissible dose of Si (1.5% or less) and Mn (5% or less) in the wire as a whole.

Moreover, the uniformity of the thickness of the sheath portion is evaluated by continuously photographing by 50 magnifications the wires of 20 mm long (sampled from three random discontinuous locations) as shown in FIG. 3b, and then obtaining the ratio (minimum value of $T_2/T_1$) of a minimum thickness $T_2$ of the thin portion to the average thickness $T_1$, which thickness are observed on the photographs.

The contents of the components of the Si—Mn ferroalloy powder or the Si—Mn—Ni ferroalloy powder have been limited as stated above, for the following reasons:

There is required 0.40% or more C to improve the crushability (property to be crushed) of the ferroalloy powder during the drawing work, and also to effectively commit the ferroalloy powder to non-magnetization. If the C content in the Si—Mn ferroalloy powder is less than 0.40%, crushing hardly occurs during the drawing work, which provides no uniformity of the thickness of the sheath portion. On the contrary, even if the C content exceeds 1.20%, there is little change of the effect related to the crushability and the non-magnetization of the ferroalloy powder; therefore, the upper limit of the C content is set to 1.20%. Moreover, in the Si—Mn—Ni ferroalloy powder, the presence of Ni causes the crushability and the non-magnetization to be accelerated; therefore, the lower limit of the C content can be decreased up to 0.30%.

There is required 5% or more Si to improve the crushability during the drawing work, because if the Si content is less than 5%, the crushability cannot be sufficiently exhibited, and then the uniformity of the thickness of the sheath portion cannot be improved. On the contrary, even if the Si content exceeds 12%, there is little change of the crushability; therefore, the upper limit of the Si content is set to 12%. On this occasion, the Si content satisfies $Si \geq 11.89-2.92\ C-0.077\ Mn$ (Equation (1)) relatively to the C and the Mn content. The composition satisfying the equation (1) causes the wire to become remarkably brittle, and almost of the grains to be cracked, which results in improvement of the crushability during the drawing work.

There is required 19% or more Mn to improve the crushability during the drawing work and the non-magnetization. Even if the Mn content exceeds 42%, there is little change of the crushability and the non-magnetization; therefore, the upper limit of the Mn content is set to 42% to thereby increase the Fe element.

The Si—Mn—Ni ferroalloy powder containing 30% or less Ni has a good crushability during the drawing work, and is substantially non-magnetized. It was confirmed that the flux-cored wire containing the above powder was good in the uniformity of the thickness of the sheath portion and the seam weldability.

The balance except the C, the Si, and the Mn component substantially consists of the Fe component. The Al, the Ti, the P, the S, and the B component can be included within limits not prejudicial to the crushability during the drawing work, the non-magnetization and the mechanical properties of the weld metal. Further, though it is preferably as few as possible in quantity from the viewpoint of toughness of the weld metal, the N content is effective in crushability and non-magnetization; therefore it can be suitably added.

The contents of the slag forming material, the fluoride, and the strong deoxidizing material contained in the flux cored wire as indispensable components have been limited as stated above, for the following reasons:

2.0 to 7.0% $TiO_2$

The $TiO_2$ component acts on to improve the slag covering properties, effectively form the bead having a smooth shape and appearance, a slag peeling properties and hold the fused metal in the all position welding. Further, the $TiO_2$ component is included as a major component of the slag formation material.

Figure 6A:
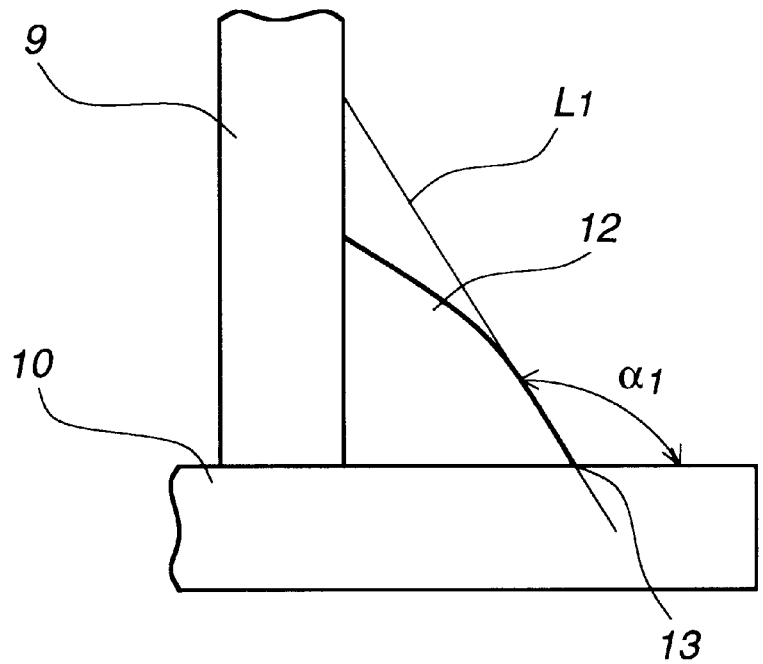
FIG. 6 is a schematic view showing a method of measuring a shape of a toe portion of a horizontal fillet welding test bead in the example.
Figure 6B:
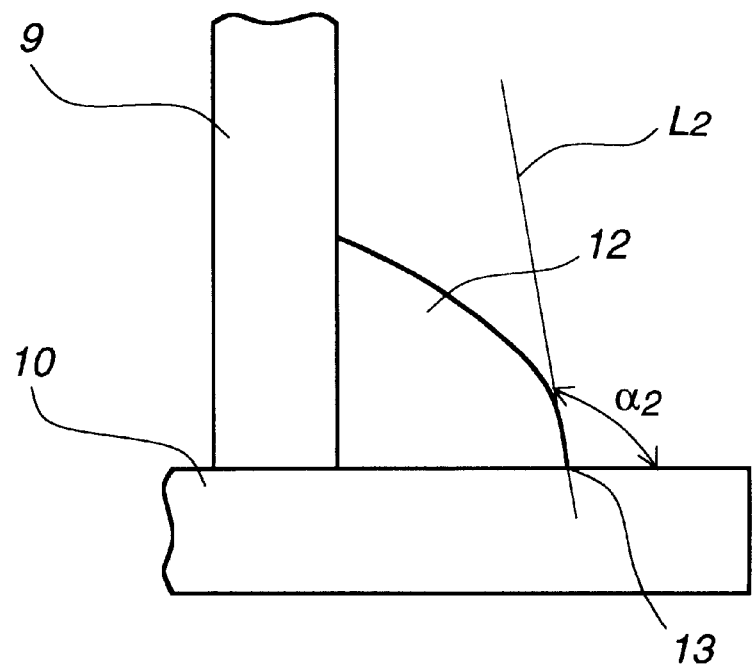

In the case of the fillet welding flux-cored wire, if the $TiO_2$ content is less than 2.0%, the slag forming amount is short, thereby providing insufficient slag covering properties, which easily provides the bead protruding and the undercut. Further, the bead is partially exposed and the slag is seized to the surface of the bead, which makes the bead appearance no good and the slag peeling properties inferior. On the contrary, if the $TiO_2$ content exceeds 5.0%, the slag formation amount becomes too much, hindering the primer combustion gas from discharging from the fused metal, which causes the pits and the worm holes to be easily formed. Further, FIGS. 6a and 6b are views which are useful in explaining the condition of a fillet welding bead 12 between an web plate 9 and a flange plate 10, to the flange plate 10. Excess $TiO_2$ content causes a bead toe portion 13 of the fillet welding bead 12 to be swelled, deteriorating the condition of the fillet welding bead 12 to the flange plate 10.

In the case of the all position flux cored wire, if the $TiO_2$ content is less than 4.0%, the slag forming amount is short, lowering the viscosity of the fused slag, which makes it difficult to carry out the upward vertical position and the overhead position welding. On the contrary, if the $TiO_2$ content exceeds 7.0%, the slag forming amount becomes too much; therefore, the vertical position welding easily provides metal running, a poor shape of the bead toe portion, slag inclusion, and cracking of the bead surface. The $TiO_2$ raw material may be made of rutile, titan slag, etc., and its content is set to the $TiO_2$-converted value.

0.2 to 1.5% $SiO_2$

The $SiO_2$ component act on to provide suitable viscosity of the fused slag, preventing deterioration of the slag covering properties when used in the high electric current condition, causing the bead to be well-shaped, and then preventing the slag seizure.

In the case of the fillet welding flux cored wire, if the $SiO_2$ content is less than 0.2%, using the wire in the high electric current condition makes the viscosity of the fused slag short, deteriorating the slag covering properties. This provides the bead protruding, and then causes a thin slag to be left, which is hard to remove on an vertical plate side of the bead, or provides pockmarks due to the slag seizure at a bead center portion. On the contrary, the $SiO_2$ content exceeds 1.2%, the slag formation amount becomes too much, causing the pits and the worm holes to be easily formed, and also the viscosity of the fused slag becomes too much, deteriorating the good condition of the bead toe portion.

In the case of the all position welding flux cored wire, if the $SiO_2$ content is less than 0.3%, the slag covering properties are deteriorated, making it easy for the upward vertical position welding to provide the metal running, and deteriorating the bead shape and the slag peeling properties. On the other hand, the $SiO_2$ content exceeds 1.5%, the vertical position welding delays the solidification of the fused slag, thereby easily providing unevenness of the bead toe portion, the metal running, and slag inclusion. The $SiO_2$ raw material may be made of silica sand, zircon sand, etc.

0.1 to 1.2% $ZrO_2$

The $ZrO_2$ component acts on to improve the slag covering properties, and to cause a bead shape to be required. Also, it is indispensable for the all position welding, In the case of the fillet welding flux cored wire, if the $ZrO_2$ content is less than 0.1%, using the wire on the high electric current condition causes the solidification of the fused slag to be delayed, causing the bead to be well-shaped with the bead toe portion swelled, also deteriorates the slag covering properties, thereby causing the bead to be exposed, or providing the slag seizure. On the contrary, if the $ZrO_2$ content exceeds 1.2%, the fused pool becomes small, hindering the primer combustion gasses from discharging, which causes the pits and the worm holes to be easily formed, and also provides such a bead shape as that the bead width to become small and further the bead protrudes with the toe portion to deteriorate the desirable condition. At the same time, the slag peeling properties also deteriorate.

In the case of the all position welding flux cored wire, if the $ZrO_2$ content is less than 0.3%, the upward vertical position welding cannot be carried out except low welding current condition. On the contrary, if the $ZrO_2$ content exceeds 1.2%, the vertical position welding easily for provides the metal running. The $ZrO_2$ raw material may be made of zircon sand, zirconia, etc.

0.01 to 0.3% fluoride (F-converted value)

The F component acts on to provide suitable concentration on the arc, raising the operability of the wire in semi-automatically welding, and also the agitation action of the arc accelerates the discharge of hydrogen gas entering into the fused pool, preventing the pits and the worm holes from being formed. Further, the F component is contained to adjust the fluidity of the fused slag to cause good slag covering properties.

In the case of the fillet welding flux cored wire, including 0.01% or more F component results in improvement of the resistance to primer and the bead shape; however, if the F component exceeds 0.3%, the viscosity of the fused slag becomes too small, providing bad influences such as the bead protruding, and the slag seizing.

In the case of the all position welding flux cored wire, including 0.01% or more F component similarly prevents the pits and the worm holes from being formed and further results in improvement of the slag covering properties; however, if the F component exceeds 0.2%, the vertical position welding easily provides the metal running. The F raw material may be made of a fluoride such as lithium fluoride, sodium fluoride, potassium silico-fluoride, and cryolite. The F content is represented by the F-converted value.

0.1 to 1.5% one or two components of (1.5% or less) Al or (0.8% or less) Mg

In the case of the all position welding flux cored wire, including 0.1% or more Al or Mg of strong deoxidizer as indispensable components reduces an oxygen amount of the weld metal, resulting in improvement of the mechanical properties, and remarkable improvement of the resistance to metal running in the vertical position welding. However, when the Al content exceeds 1.5%, the Mg content exceeds 0.8%, the sum of one or two components of the Al content or the Mg content exceeds 1.5%, the $Al_2O_3$ or MgO content becomes too much, which easily causes the metal running to occur. Moreover, in the case of the fillet welding flux cored wire, though the Al or Mg component is effective to form the bead, using the low-priced $Al_2O_3$ or MgO component as a slag formation material makes the bead shape good.

Figure 2A:
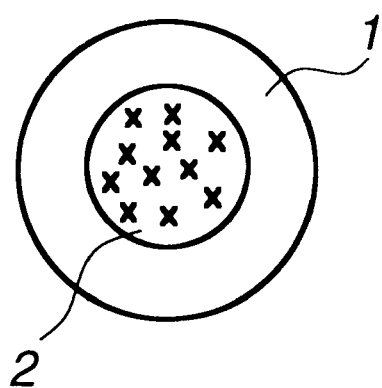
FIG. 2 is a schematic view showing a cross sectional construction example of the flux-cored wire.
Figure 2B:
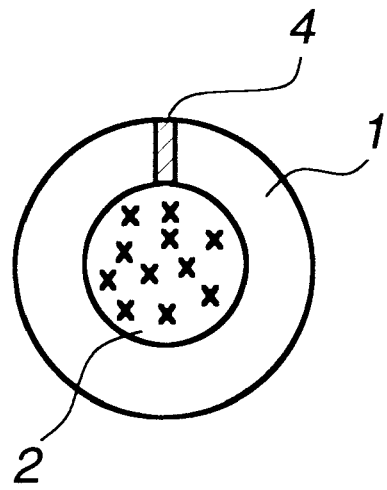

In both the fillet welding and the all position welding flux cored wire in common, reducing the hydrogen content of the wire to the utmost results in effective improvement of the resistance to primer and the resistance to cracking. Seamless type flux cored wires in which flux 2 is cored in a sheath portion 1 as shown by the section views of FIGS. 2a and 2b can be subjected to high temperature dehydrogenation treatment in production, and further it is not subjected to moisture absorption in use after unsealed, remarkably reducing the hydrogen content of the wire. The flux cored wire having such a cross sectional construction is produced by generally filling flux 2 in a sheath body 1 comprising a steel pipe, as shown in FIG. 2a, or by forming a band steel into a tubular sheath body 1, while filling flux 2 in the sheath body 1, and then welding a seam of the band steel, as shown in FIG. 2b, for example, Japanese Patent Publication of examined applications (Kokoku) No. 4-72640 and No. 4-62838, and Japanese Patent Publication of examined applications (Kokai) No. 5-31594.

In particular, the seamless type flux cored wire produced by welding the seam of the band steel has a problem that including ferromagnetic raw material in the flux causes the ferromagnetic raw material to be absorbed to the seam welded portion, causing the sheath to easily undergo minute cracking, which causes the welding performance to be adversely affected. Therefore, a method best suited to improving the welding performance of the seamless type flux cored wire produced by welding the seam of the band steel is to include in the flux substantially non-magnetic powder having a good crushability during the wire production. The powder is selected from the Si—Mn ferroalloy powder and the Si—Mn—Ni ferroalloy powder.

It was confirmed that a ferroalloy powder, of relative magnetic permeability ($\mu$) up to 1.10, selected from the Si—Mn ferroalloy powder and the Si—Mn—Ni ferroalloy powder is capable of stably carrying out the seam welding without subjecting the welded portion to incomplete fusion, providing a stable wire fused condition during welding, which prevents the pits to be formed and then the shape and the appearance of the bead to be adversely affected. The relative magnetic permeability ($\mu$) of 1.10 means a limit value below which the ferroalloy powder has little ferrite and hence slightly magnetized. The relative magnetic permeability ($\mu$) is measured by a vibration sample type magnetometer.

According to the flux cored wire of the present invention, further including iron powder increases the weld metal amount, resulting in improvement of the work efficiency, causing the arc condition to be remarkably stabilized, and enlarging the fused pool.

In the case of the fillet welding flux cored wire, the stabilization of the arc condition and the enlargement of the fused pool accelerates the discharge of the primer combustion gasses, and results in further improvement of the resistance to primer and the conformability of the bead toe portion. In the case of the all position welding flux cored wire, the resistance to metal running which provides a problem in the vertical welding is improved.

In the present invention, the iron powder content is limited to 10% or less of the total wire weight. This is because including the metal powder in the flux too much to thereby increase the flux filling ratio causes the thickness of the sheath portion at large to be thinned, causing the wire to be broken through the wire production.

Moreover, since the iron powder is made of ferromagnet, when preparing the sheath portion by welding the seam of the band steel, it is preferable to take account of, e.g. the seam welding speed, the size of the tubular body, and the countermeasure of the devices in the vicinity of the seam welded portion in such a manner that the iron powder is not absorbed to the seam welded portion, and to add binder such as water glass and dextrin to thereby make the flux in an agglomerated condition rather than in an unagglomerated condition in which the raw material is maintained unchanged.

The flux cored wire according to the present invention exhibits the resistance to primer much more by further including hydrogen up to 0.007% of the wire. The hydrogen contained of the flux cored wire itself, e.g. water content attached to the surface of the wire, the hydrogen in the steel-made sheath, and the water content in the filled flux, increases partial pressure of the hydrogen in the arc atmosphere, increasing the content of the hydrogen entering into the fused pool, which causes the pits and worm holes to be formed. Therefore, in the seamless type flux cored wire, it is important to dry and burn the flux before filling of the flux, and select the intermediate annealing condition of sufficiently reducing the hydrogen content. On the contrary, in the case of the flux cored wire, having a sheath portion 1 provided with a seam 3, shown by sectional views of FIGS. 2c and 2d, it is preferable to subject the wire to a hygroscopic resistant treatment and to burn the wire so as not to deteriorate the flux 2 in the wire, as is distinct from seamless type ones shown in FIGS. 2a and 2b. Moreover, the hydrogen content of the wire has been measured by an inert gas fusion heat conducting method carried out with the whole wire fused.

The content of nitrogen of the flux cored wire according to the present invention is, in order to ensure impact toughness, preferably at most 0.010% or less, further preferably 0.005% or less particularly when low temperature toughness of –40° C. or less is required. The wire contains all nitrogen content of the steel-made sheath, the Si—Mn ferroalloy powder, the Si—Mn—Ni ferroalloy powder, and other flux raw material powder, and in an air included together with the flux during production; therefore, the nitrogen should be reduced to the utmost.

Moreover, there can be included, as the other wire components, a slag formation material such as $Al_2O_3$, MgO, FeO, $Fe_2O_3$, MnO, $MnO_2$, and $FeS_2$, a gas generating material such as $MnCO_3$ and $CaCO_3$, an alloy material such as Cr, Mo, Nb, V, and B, and a slag peeling properties accelerator, such as Bi and $Bi_2O_3$, without deteriorating the effect according to the present invention.

Among these component elements, $Al_2O_3$, MgO, and an iron oxide such as FeO, $Fe_2O_3$ may be included as a slag formation material, in the fillet welding flux cored wire, which results in improvement of the bead shape and the resistance to primer. However, if the $Al_2O_3$ content exceeds 1.0%, there appears solidification inequality on the fused slag in the horizontal fillet welding, deteriorating the shape and the appearance of the bead, i.e. the inequality of the bead toe portion, and further the slag peeling properties. If the MgO content exceeds 1.0%, there appears some bad influences, e.g. that the slag formation amount increases to deteriorate the resistance to primer, and the viscosity of the slag excessively reduces to deteriorate the slag covering properties, the uniformity of the lower plate side bead toe portion, and the slag removing property. Though it is preferable in the upward vertical position welding, including the $Al_2O_3$ component in the all position welding flux cored wire easily provides the metal running in the downward vertical position welding; therefore, it was determined that the $Al_2O_3$ component can be suitably added.

The steel-made sheath may be made of mild steel which is generally used for the conventional flux cored wire from the viewpoint of the drawability of the wire. Otherwise, using an alloy steel material containing rather large Si and Mn content may provide the high deposited properties.

The flux-filling ratio is set to 10% or more to provide the high deposited properties and the high work efficiency. If the upper limit of the flux-filling ratio is excessively increased, the thickness of the sheath portion becomes thin, causing the wire to be easily broken in production of the wire. Therefore, the upper limit is preferably set to 25% or less.

The diameter of the wire is preferably as a small as 1.0 to 2.0 mm, providing the high deposited properties. It is recommended that the wire has a general cross sectional construction of the conventional flux-cored wire shown in FIGS. 2a to 2d.

The shield gas used in combination with the flux-cored wire according to the present invention is comprised of $CO_2$ gas, otherwise may be comprised of Ar system mixed gases.

Next, the effect exhibited by the present invention will be described in detail with reference to the examples.

EXAMPLE 1

Table 1 shows the sizes and the chemical compositions of steel pipes and band steels used in the examples.

TABLE 1

| Symbol | Kind | Size (mm) | C | Si | Mn | P | S | N |
|---|---|---|---|---|---|---|---|---|
| P1 | Steel Pipe | Outer Diameter 13.8 Thickness 2.0 | 0.03 | 0.01 | 0.24 | 0.008 | 0.003 | 0.016 |
| H1 | Band Steel | Width 12.7 Thickness 0.6 | 0.01 | 0.01 | 0.28 | 0.014 | 0.096 | 0.004 |
| H2 | Band Steel | Width 63.0 Thickness 2.2 | 0.04 | 0.01 | 0.24 | 0.012 | 0.004 | 0.012 |

Flux-cored wires were prepared by diameter-reducing mild steel-made steel pipes (P1) shown in Table 1 down to such a diameter as to provide a predetermined flux filling ratio, and then filling flux (agglomerated flux) through one end opening of the steel pipe by a vibration filling method. Thereafter, the wire was subjected to drawing down to 3.2 mm in wire diameter by a group of rolls and a group of perforated dies, and then to intermediate annealing (650° C.×2 hr) for mitigating hardening of the work and dehydrogenation treatment. Thus, there were prepared seamless type fillet welding flux cored wires (Symbol: W1 to W17, 1.6 mm in wire diameter) having a wire sectional construction shown in FIG. 2a. There are shown in Table 2 compositions and relative magnetic permeability of the Si—Mn ferroalloy powder or the Si—Mn—Ni ferroalloy powder, in Table 3 the details of the test wires, and further in Table 4 the investigation results related to the uniformity of the thickness of the sheath portion and the horizontal welding test results, which were obtained by the observation of the sections of the test wires.

TABLE 2

| | Composition (Weight %), Balance: Fe | | | | | | | Equation (1): Si | Equation (2): Si | Relative Magnetic Permeabiliy ($\mu$) |
|---|---|---|---|---|---|---|---|---|---|---|
| Symbol | C | Si | Mn | P | S | Ni | N | | | |
| FA 1 | 0.43 | 11.6 | 28.3 | 0.08 | 0.004 | — | 0.005 | ≧8.5 | | * |
| FA 2 | 0.75 | 10.5 | 19.4 | 0.10 | 0.004 | — | 0.005 | ≧8.2 | | * |
| FA 3 | 0.50 | 9.6 | 32.0 | 0.08 | 0.004 | — | 0.006 | ≧8.0 | | * |
| FA 4 | 0.51 | 8.5 | 37.0 | 0.08 | 0.004 | — | 0.006 | ≧7.6 | | 1.24 |
| FA 5 | 1.20 | 5.4 | 41.5 | 0.12 | 0.006 | — | 0.015 | ≧5.2 | | 1.02 |
| FA 6 | 0.52 | 8.3 | 36.1 | 0.06 | 0.004 | — | 0.040 | ≧7.6 | | 1.04 |
| FA 7 | 0.48 | 8.7 | 36.5 | 0.07 | 0.004 | — | 0.096 | ≧7.7 | | 1.04 |
| FA 8 | 0.42 | 11.3 | 20.0 | 0.08 | 0.004 | 10.0 | 0.004 | | ≧8.5 | * |
| FA 9 | 0.65 | 8.3 | 33.4 | 0.08 | 0.003 | 5.6 | 0.004 | | ≧7.1 | 1.02 |
| FA10 | 0.31 | 7.5 | 32.0 | 0.08 | 0.004 | 26.8 | 0.004 | | ≧6.9 | 1.01 |

(Remarks)
*: To be absorbed to magnet
Equation (1): Si ≧ 11.89 − 2.92 C − 0.077 Mn
Equation (2): Si ≧ 11.89 − 2.92 C − 0.077 Mn − 0.062 Ni

TABLE 3

(Ratio to Wire Total Weight:Weight %)

| Invention Division | Wire Symbol | Wire Division | Wire Sectional Construction | Steel-Made Sheath Symbol | Filled Ratio (%) | Flux Division | Filled Flux Composition ||||||||
|---|---|---|---|---|---|---|---|---|---|---|---|---|---|---|
| | | | | | | | Si–Mn Ferroalloy Powder || Si–Mn–Ni Ferroalloy Powder || Ferro-Silicon 42% Si | Ferro-Manganese 74% Mn | Ni Powder | Silicon-Manganese ||
| | | | | | | | Symbol | Content | Symbol | Content | | | | 20% Si | 62% Mn |
| Present Invention | W1 | Fillet | FIG. 2a | P1 | 12.2 | Agglomeration | FA1 | 2.3 | — | — | 1.2 | 1.5 | — | 0.8 | — |
| | W2 | | | | 15.0 | | FA3 | 7.3 | — | — | — | — | — | 0.8 | — |
| | W3 | | | | 13.1 | | FA4 | 1.3 | — | — | — | 1.0 | — | 0.8 | 2.5 |
| | W4 | | | | 12.6 | | FA4 | 7.5 | — | — | — | — | — | 0.8 | — |
| | W5 | | | | 13.5 | | FA5 | 6.5 | — | — | — | — | — | 0.8 | — |
| | W6 | | | | 12.6 | | — | — | FA8 | 1.5 | — | 1.0 | — | 0.8 | 1.7 |
| | W7 | | | | 12.6 | | — | — | FA9 | 6.6 | — | — | — | 0.8 | — |
| Comparison Example | W8 | | | | 12.2 | | FA1 | 2.3 | — | — | 1.2 | 1.5 | — | 0.8 | — |
| | W9 | | | | 15.1 | | FA3 | 7.3 | — | — | — | — | — | 0.8 | — |
| | W10 | | | | 12.9 | | FA4 | 7.5 | — | — | — | — | — | 0.8 | — |
| | W11 | | | | 15.5 | | FA5 | 6.5 | — | — | — | — | — | 0.8 | — |
| | W12 | | | | 12.6 | | FA4 | 7.6 | — | — | — | — | — | 0.8 | — |
| | W13 | | | | 14.0 | | FA4 | 6.7 | — | — | — | — | — | 0.8 | — |
| | W14 | | | | 12.6 | | FA4 | 0.5 | — | — | 1.5 | 3.4 | — | 0.8 | 2.2 |
| | W15 | | | | 12.4 | | — | — | FA8 | 0.7 | — | 0.7 | — | 0.8 | 3.3 |
| | W16 | | | | 12.1 | | — | — | — | — | — | 0.8 | 0.6 | 0.8 | — |
| | W17 | | | | 12.1 | | — | — | — | — | 1.3 | 2.9 | — | 0.8 | — |

| Invention Division | Wire Symbol | Filled Flux Composition |||||||| Hydrogen Content of Wire (%) |
|---|---|---|---|---|---|---|---|---|---|---|
| | | Al₂O₃ | MgO | Iron Oxide | Fluoride | Fluoride (F-converted value) | Al | Mg | Iron Powder | |
| Present Invention | W1 | 0.3 | — | 0.1 | 0.02 | 0.01 | 0.2 | 0.3 | 2.2 | 0.002 |
| | W2 | 0.7 | — | 0.2 | 0.5 | 0.26 | — | — | — | 0.002 |
| | W3 | — | 0.3 | — | 0.2 | 0.10 | 0.1 | — | 3.2 | 0.002 |
| | W4 | 0.2 | 0.3 | — | 0.2 | 0.10 | 0.1 | — | — | 0.002 |
| | W5 | 0.2 | 0.1 | 0.5 | 0.3 | 0.16 | — | — | — | 0.002 |
| | W6 | 0.2 | — | 0.3 | 0.2 | 0.10 | — | 0.2 | 2.6 | 0.002 |
| | W7 | 0.3 | — | 0.3 | 0.2 | 0.10 | — | 0.2 | — | 0.002 |
| Comparison Example | W8 | 0.3 | — | 0.1 | 0.02 | 0.01 | 0.2 | 0.3 | 2.9 | 0.002 |
| | W9 | — | — | — | — | — | — | — | — | 0.002 |
| | W10 | — | — | 0.3 | 0.2 | 0.10 | 0.1 | — | — | 0.002 |
| | W11 | 0.2 | 0.1 | 0.5 | 0.3 | 0.16 | — | — | 1.9 | 0.002 |
| | W12 | — | 0.3 | — | 0.8 | 0.42 | 0.1 | 0.2 | 3.0 | 0.002 |
| | W13 | 0.5 | — | 0.1 | 0.2 | 0.10 | — | — | — | 0.002 |
| | W14 | 0.3 | 0.3 | 0.2 | 0.2 | 0.10 | — | — | 3.0 | 0.002 |
| | W15 | 0.2 | — | 0.3 | 0.2 | 0.10 | — | 0.2 | 1.3 | 0.002 |
| | W16 | 0.3 | — | 0.2 | 0.2 | 0.10 | — | 0.2 | — | 0.002 |
| | W17 | 0.3 | — | 0.3 | 0.2 | 0.10 | — | — | — | 0.002 |

| Wire Symbol | TiO₂ | SiO₂ | ZrO₂ |
|---|---|---|---|
| W1 | 2.2 | 0.7 | 0.4 |
| W2 | 4.6 | 0.4 | 0.5 |
| W3 | 3.0 | 0.6 | 0.1 |
| W4 | 3.0 | 0.6 | 0.1 |
| W5 | 3.5 | 1.1 | 0.5 |
| W6 | 3.0 | 0.3 | 0.8 |
| W7 | 3.0 | 0.3 | 1.0 |
| W8 | 1.5 | 0.7 | 0.4 |
| W9 | 5.7 | 0.5 | 0.5 |
| W10 | 3.1 | 0.1 | 0.8 |
| W11 | 3.5 | 1.9 | 1.7 |
| W12 | 3.0 | 0.6 | — |
| W13 | 4.0 | 0.6 | 0.3 |
| W14 | 2.8 | 0.6 | 0.1 |
| W15 | 3.0 | 0.3 | 0.8 |
| W16 | 2.8 | 0.6 | 0.1 |
| W17 | 3.1 | 0.3 | 0.8 |

Remarks: (1) Fluoride:Potassium silico-fluoride (2) Arc stabilizer:Potassium feldspar, Sodium titanate, Water glass solid material (Potassium silicate)

TABLE 4

| Invention Division | Test No. | Wire Symbol | Uniformity of Thickness - Sheath Portion - Minimum $T_2/T_1$ | Uniformity of Thickness - Sheath Portion - Raw Material Biting | Horizontal Fillet Welding Test Results - Arc Stability | Horizontal Fillet Welding Test Results - Slag Covering Property | Horizontal Fillet Welding Test Results - Resistance to Primer - Pit (Number/m) | Horizontal Fillet Welding Test Results - Resistance to Primer - Worm Hole (Occurrence Rate %) | Evaluation |
|---|---|---|---|---|---|---|---|---|---|
| Present Invention | 1 | W1 | 0.95 | Non | ○ | ○ | 0 | 0 | ◎ |
|  | 2 | W2 | 0.95 | Non | ○ | ◎ | 0 | 0 | ◎ |
|  | 3 | W3 | 0.92 | Non | ○ | ○ | 1 | 0 | ○ |
|  | 4 | W4 | 0.95 | Non | ○ | ◎ | 0 | 0 | ◎ |
|  | 5 | W5 | 0.97 | Non | ○ | ◎ | 0 | 0 | ◎ |
|  | 6 | W6 | 0.93 | Non | ○ | ○ | 1 | 0 | ○ |
|  | 7 | W7 | 0.96 | Non | ○ | ◎ | 0 | 0 | ◎ |
| Comparison Example | 8 | W8 | 0.92 | Non | ○ | Δ | 0 | 0 | X |
|  | 9 | W9 | 0.94 | Non | ○ | ○ | 38 | 25 | X |
|  | 10 | W10 | 0.93 | Non | ○ | Δ | 2 | 0 | ○ |
|  | 11 | W11 | 0.94 | Non | ○ | ○ | 19 | 18 | X |
|  | 12 | W12 | 0.95 | Non | ○ | Δ | 3 | 0 | ○ |
|  | 13 | W13 | 0.91 | Non | Δ | Δ | 10 | 0 | X |
|  | 14 | W14 | 0.83 | Presence | Δ | Δ | 16 | 0 | X |
|  | 15 | W15 | 0.80 | Presence | Δ | Δ | 13 | 0 | X |
|  | 16 | W16 | 0.81 | presence | Δ | Δ | 18 | 0 | X |
|  | 17 | W17 | 0.79 | presence | Δ | Δ | 22 | 0 | X |

| Invention Division | Test No. | Horizontal Fillet Welding Test Results - Shape and Appearance of Bead - Evaluation for Shape | Slag Seizure | Remarks | Evaluation | Slag Peeling Property | Over-All Judgement |
|---|---|---|---|---|---|---|---|
| Present Invention | 1 | ○ | ○ | — | ○ | ○ | Excellent |
|  | 2 | ○ | ○ | — | ○ | ○ | Excellent |
|  | 3 | ○ | ○ | — | ○ | ○ | Excellent |
|  | 4 | ○ | ○ | — | ○ | ○ | Excellent |
|  | 5 | ○ | ○ | — | ○ | ○ | Excellent |
|  | 6 | ○ | ○ | — | ○ | ○ | Excellent |
|  | 7 | ○ | ○ | — | ○ | ○ | Excellent |
| Comparison Example | 8 | X | X | *1 | X | X | Inferior |
|  | 9 | Δ | ○ | *2 | Δ | ○ | Inferior |
|  | 10 | Δ | X | *3 | X | X | Inferior |
|  | 11 | X | X | *4 | X | X | Inferior |
|  | 12 | Δ | Δ | *5 | Δ | X | Inferior |
|  | 13 | X | X | *6 | X | X | Inferior |
|  | 14 | Δ | ○ | *7 | Δ | ○ | Inferior |
|  | 15 | Δ | ○ | *7 | Δ | Δ | Inferior |
|  | 16 | Δ | ○ | *7 | Δ | Δ | Inferior |
|  | 17 | Δ | ○ | *7 | Δ | Δ | Inferior |

Figure 4:
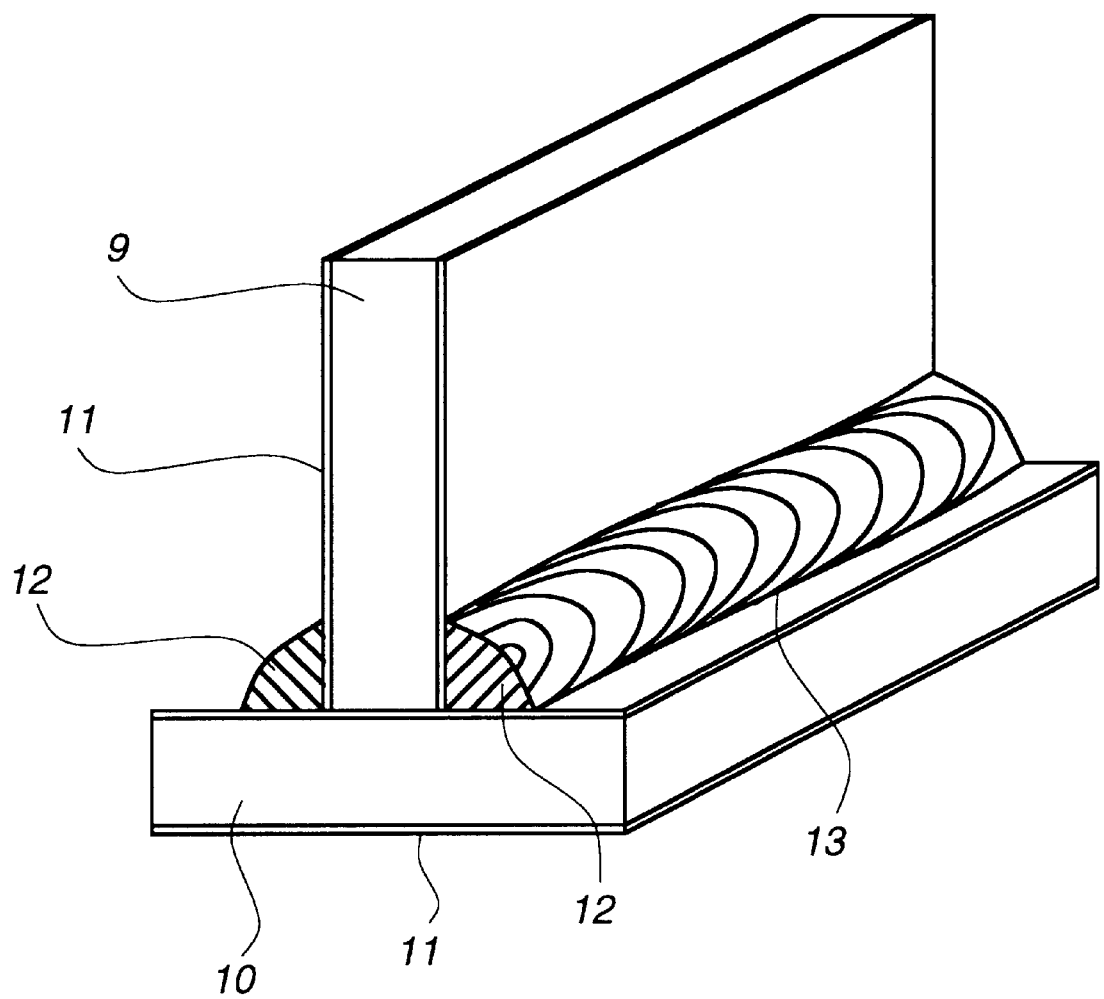
FIG. 4 is a schematic view showing a test piece used in a horizontal fillet welding test in the example, and the bead formed by welding.
Figure 5:
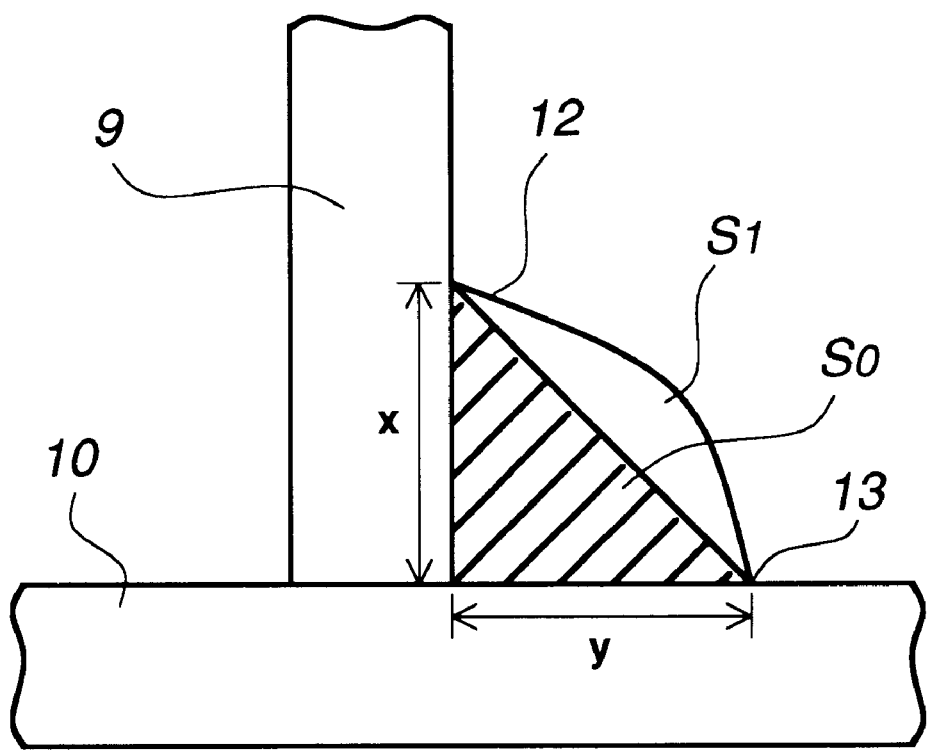
FIG. 5 is a schematic view showing a method of measuring a rate of reinforcement of weld of a horizontal fillet welding test bead in the example.

(Remarks)
*1:Shortage of slag amount
*2:Inferior condition of toe portion
*3:Pitted slag, remarkable slag seizure
*4:Inferior condition of toe portion, much slag seizure
*5:Inferior condition of toe portion
*6:Inferior condition of toe portion, much slag seizure
*7:Bead slightly protruding FIGS. 4 to 6 are useful in explaining a fillet welding manner, and a manner of measuring an excess metal rate and a bead toe portion angle for evaluating the bead shape.

The uniformity of the sheath portion of the test wire is evaluated as in the case with FIG. 3. The flux raw material is considered to have bit into the sheath portion, if $(T_2/T_1)$ is less than 0.90.

In the horizontal fillet welding test, an vertical plate 9 and a lower plate 10 were set in a reverse T-like manner with no gap therebetween, as shown in FIG. 4. Automatic welding was made to form fillet-welding beads 12 simultaneously at both sides thereof, which provided a fillet weld joint. Each of the vertical plate 9 and the lower plate 10, which were used for tests, is made of an inorganic zinc primer applied steel plate (kind of steel: SM490, 12 mm in thickness×150 cm in length, approx. 20 $\mu$m in primer film thickness, no gap between vertical plate and lower plate), a surface of which is applied with a primer paint 11. The welding condition was given as 350 A-welding electric current, 32 to 33 V-arc voltages, and approx. 80 cm/min-welding speed, 25 mm-chip-to-base material distance, and 25 L/min-flow rate of $CO_2$ shield gas.

The evaluation symbols of the arc stabilizer, the slag covering properties, the resistance to primer, the shape and the appearance of the bead, and the slag peeling properties designate "Excellent" with the ◎ mark, "Good" with the ○ mark, "Inferior" with the Δ mark, and "No good", with the X mark. The evaluation symbols of the slag seizure designate "No occurrence" with the ○ mark, "Slight occurrence" with the Δ mark, and "Frequent occurrence" with the X mark.

The resistance to primer is evaluated so as to be good if no worm hole occurs and pit occurrence the number is 3 or less per one meter.

FIG. 5 is a sectional view useful in explaining a manner of measuring the excess metal rate. As shown in FIG. 5, the excess metal rate (%) is calculated by $\{S_1/(S_0+S_1)\}\times 100$, where an angle contained between the vertical plate 9 and the lower plate 10 is 90°, a sectional area of a triangle shown by hatching, which is obtained by an upper leg length x and a lower leg length y is $S_0$, and a sectional area of the excess metal portion of the bead swelled above between the upper and the lower bead toe portion is $S_1$.

Also, FIGS. 6a and 6b are sectional views useful in explaining a method of measuring a bead toe portion angle. As shown in FIGS. 6a and 6b, the bead tow portion angle is defined by angles $\alpha_1$, $\alpha_2$ contained by tangent lines $L_1$, $L_2$ of a bead section passing through a bead toe portion 13 and the lower plate 10, in which the bead toe portion 13 means a position at which the fillet welding bead 12 rises up from the lower plate 10. FIG. 6a shows a case in which the condition of the bead toe portion is good, and FIG. 6b is a case in which the bead toe portion is swelled with inferior condition. Therefore, the toe portion angle ($\alpha$) is larger in a case of FIG. 6a than in that of FIG. 6b.

The bead shape was evaluated to be good when the excess metal rate obtained by the measuring method shown in FIG. 5 is 20% or less, the bead toe portion angle ($\alpha$) obtained by the measuring method shown in FIGS. 6a and 6b is 120° or more, the visual check shows the bead toe portion is well uniform without undercut, and further the bead is generally smooth.

Moreover, the test pieces Nos. 1 to 7, which correspond to the flux cored wires (W1 to W7) according to the present invention, were small in the change of the thickness of the sheath portion, and had good results for the resistance to primer, the shape and the appearance of the bead, and the slag peeling properties. Country to this, test pieces Nos. 8 to 17 belong to the comparison samples.

The test piece No. 8 (W8) corresponds to a wire including insufficient $TiO_2$ component and not containing fluoride component, the test piece No. 9 (W9) a wire including too much $TiO_2$ component, the test piece No. 10 (W10) a wire including insufficient $SiO_2$ component, the test piece No. 11 (W11) a wire including too much $SiO_2$ and $ZrO_2$ component, the test piece No. 12 (W12) a wire including no $ZrO_2$ component, the test piece No. 13 (W13) a wire including too much fluoride component, the test piece No. 14 (W14) a wire including insufficient Si—Mn ferroalloy powder (FA4) component, the test piece No. 15 (W15) a wire including insufficient Si—Mn—Ni ferroalloy powder (FA8) component, the test piece No. 16 (W16) a wire including no component of Si—Mn ferroalloy powder which is specified by the present invention, and the test piece No. 17 (W17) a wire including no component of Si—Mn—Ni ferroalloy powder which is specified by the present invention. Table 4 shows these comparison examples have problems that the arc stabilization or the slag covering properties were deteriorated, the pits and the worm holes were formed, the bead shape was of no good, and the slag peeling properties were of no good.

EXAMPLE 2

As is the case with the example 1, seamless type fillet welding flux cored wires (Symbol: W18 to W30, 1.2 mm in wire diameter) having a wire sectional construction shown in FIG. 2a were prepared by filling the flux in the mild steel-made steel pipes (P1) shown in Table 1 aforementioned by a vibration filling method. Table 5 shows the details of the test wires, and Tables 6 and 7 show the observation results of the sections of the test wires related to the uniformity of the thickness of the sheath portion, and the downward and the upward vertical position welding test results. Moreover, Tables 6 and 7 show the welding test results of the examples 2 and 3 also. The vertical welding test is directed to T-like fillet weld joints of inorganic zinc primer painted plates (kind of steel: SM490, 12 mm in thickness×50 cm in length, approx. 20 μm in primer film thickness, no gap between the vertical plate and the lower plate) which were subjected to semi-automatically welding.

TABLE 5

(Ratio to Total Weight:Wire Weight %)

| Invention Division | Wire Symbol | Wire Division | Wire Sectional Construction | Steel-Made Sheath Symbol | Flux Filled Ratio (%) | Flux Division | Filled Flux Composition | | | | | | |
|---|---|---|---|---|---|---|---|---|---|---|---|---|---|
| | | | | | | | Si—Mn Ferroalloy Powder | | Si—Mn—Ni Ferroalloy Powder | | Ferro-Silicon 42% Si | Ferro-Manganese 74% Mn | Silicon-Manganese 20% Si 62% Mn |
| | | | | | | | Symbol | Content | Symbol | Content | | | |
| Present Invention | W18 | All Position | FIG. 2a | P1 | 16.0 | Agglomeration | FA3 | 6.5 | — | — | — | — | — |
| | W19 | | | | 12.9 | | FA3 | 6.5 | — | — | — | — | — |
| | W20 | | | | 15.2 | | FA4 | 6.0 | — | — | — | — | — |
| Comparison Example | W21 | | | | 16.3 | | FA4 | 6.0 | — | — | — | — | — |
| | W22 | | | | 15.7 | | FA4 | 6.0 | — | — | — | — | — |
| | W23 | | | | 13.0 | | FA4 | 6.0 | — | — | — | — | — |
| | W24 | | | | 15.5 | | FA4 | 6.0 | — | — | — | — | — |
| | W25 | | | | 13.4 | | FA4 | 6.0 | — | — | — | — | — |
| | W26 | | | | 14.6 | | FA4 | 0.5 | — | — | — | — | — |
| Present Invention | W27 | | | | 13.1 | | — | — | FA8 | 2.0 | 0.6 | 2.0 | — |
| | W28 | | | | 13.5 | | — | — | FA9 | 5.5 | — | — | — |
| Comparison Example | W29 | | | | 14.1 | | — | — | FA9 | 5.5 | — | — | — |
| | W30 | | | | 13.1 | | — | — | FA9 | 0.5 | — | 0.5 | 2.1 |

| Invention Division | Wire Symbol | Filled Flux Composition | | | | | | | | | | | | | Hydrogen Content of Wire (%) |
|---|---|---|---|---|---|---|---|---|---|---|---|---|---|---|---|
| | | $TiO_2$ | $SiO_2$ | $ZrO_2$ | $Al_2O_3$ | MgO | Iron Oxide | Fluoride | Fluoride (F-converted value) | Al | Mg | Iron Powder | Ni Powder | Arc Stabilizer | |
| Present Invention | W18 | 6.3 | 0.8 | 1.1 | — | — | 0.2 | 0.1 | 0.05 | 0.1 | 0.3 | — | — | 0.6 | 0.002 |
| | W19 | 4.3 | 0.5 | 0.6 | — | 0.2 | — | 0.04 | 0.02 | — | 0.2 | — | — | 0.6 | 0.002 |
| | W20 | 5.4 | 1.2 | 0.4 | — | — | — | 0.3 | 0.16 | 1.3 | — | — | — | 0.6 | 0.002 |
| Comparison Example | W21 | 7.6 | 0.6 | 0.6 | — | — | 0.2 | 0.1 | 0.05 | 0.3 | 0.3 | — | — | 0.6 | 0.002 |
| | W22 | 5.2 | 2.1 | 0.6 | 0.5 | — | — | 0.1 | 0.05 | 0.3 | 0.3 | — | — | 0.6 | 0.002 |
| | W23 | 5.5 | 0.2 | — | — | — | — | 0.1 | 0.05 | 0.3 | 0.3 | — | — | 0.6 | 0.002 |
| | W24 | 6.0 | 0.7 | 1.6 | — | — | — | — | — | 0.3 | — | — | — | 0.6 | 0.002 |
| | W25 | 5.5 | 0.7 | 0.5 | — | — | — | 0.06 | 0.03 | — | 0.3 | — | — | 0.6 | 0.002 |
| | W26 | 5.2 | 1.3 | 0.4 | 0.5 | — | — | 0.1 | 0.05 | 1.0 | — | 1.6 | — | 0.6 | 0.002 |
| Present Invention | W27 | 4.8 | 0.6 | 0.5 | — | — | — | 0.1 | 0.05 | 0.2 | 0.3 | 0.8 | 0.10 | 0.6 | 0.002 |
| | W28 | 5.0 | 0.4 | 0.6 | — | — | — | 0.1 | 0.05 | 0.6 | 0.7 | — | — | 0.6 | 0.002 |
| Comparison Example | W29 | 5.0 | 0.4 | 0.6 | — | — | — | 0.1 | 0.05 | 0.9 | 1.0 | — | — | 0.6 | 0.002 |
| | W30 | 5.0 | 0.4 | 0.6 | — | — | — | 0.1 | 0.05 | 0.3 | 0.3 | 2.4 | 0.3 | 0.6 | 0.002 |

Remarks:
(1) Fluoride:Potassium silico-fluoride
(2) Arc stabilizer:Potassium feldspar, Sodium titanate, Water glass solid material (Potassium silicate)

TABLE 6

| Example Division | Invention Division | Test Piece No. | Wire Symbol | Uniformity of Thickness of Sheath Minimum T₂/T₁ | Portion Raw Material Biting | Arc Stability | Slag Covering Property | Downward Vertical Position Welding 280A Metal Running | Condition of Bead Toe Portion | Slag Inclusion | Slag Peeling Property |
|---|---|---|---|---|---|---|---|---|---|---|---|
| Example 2 | Present Invention | 18 | W18 | 0.95 | Non | ○ | ⊚ | Non | ○ | Non | ○ |
|  |  | 19 | W19 | 0.95 | Non | ○ | ⊚ | Non | ○ | Non | ○ |
|  |  | 20 | W20 | 0.94 | Non | ○ | ⊚ | Non | ○ | Non | ○ |
|  | Comparison Example | 21 | W21 | 0.94 | Non | ○ | △ | Presence | △ | — | △ |
|  |  | 22 | W22 | 0.94 | Non | ○ | △ | Presence | △ | — | △ |
|  |  | 23 | W23 | 0.95 | Non | ○ | △ | Presence | △ | — | ○ |
|  |  | 24 | W24 | 0.95 | Non | ○ | △ | Presence | △ | — | ○ |
|  |  | 25 | W25 | 0.94 | Non | ○ | △ | Presence | ○ | Non | ○ |
|  |  | 26 | W26 | 0.82 | Presence | △ | ⊚ | Non | ○ | Non | ○ |
| Example 3 | Present Invention | 37 | W37 | 0.95 | Non | ⊚ | ⊚ | Non | ○ | Non | ○ |
|  |  | 38 | W38 | 0.94 | Non | ○ | ○ | Non | ○ | Non | ○ |
|  |  | 39 | W39 | 0.90 | Non | ○ | ⊚ | Non | ○ | Non | ○ |
|  |  | 40 | W40 | 0.96 | Non | ○ | ⊚ | Non | ○ | Non | ○ |

| Example Division | Invention Division | Test Piece No. | Arc Stabilizer | Slag Covering Property | Downward Vertical Position Welding 300A Metal Running | Condition of Bead Toe Portion | Slag Inclusion | Slag Peeling Property | Arc Stability | Slag Covering Property | 310A Metal Running | Condition of Bead Toe Portion | Slag Inclusion | Slag Peeling Property |
|---|---|---|---|---|---|---|---|---|---|---|---|---|---|---|
| Example 2 | Present Invention | 18 | ○ | ⊚ | Non | ○ | Non | ○ | — | — | — | — | — | — |
|  |  | 19 | ○ | ⊚ | Non | ○ | Non | ○ | — | — | — | — | — | — |
|  |  | 20 | ○ | ⊚ | Non | ○ | Non | ○ | — | — | — | — | — | — |
|  | Comparison Example | 21 | — | — | — | — | — | — | — | — | — | — | — | — |
|  |  | 22 | — | — | — | — | — | — | — | — | — | — | — | — |
|  |  | 23 | — | — | — | — | — | — | — | — | — | — | — | — |
|  |  | 24 | — | — | — | — | — | — | — | — | — | — | — | — |
|  |  | 25 | — | — | — | — | — | — | — | — | — | — | — | — |
|  |  | 26 | — | — | — | — | — | — | — | — | — | — | — | — |
| Example 3 | Present Invention | 37 | ○ | ○ | Non | ○ | Non | ○ | — | — | — | — | — | — |
|  |  | 38 | ⊚ | ⊚ | Non | ○ | Non | ○ | ⊚ | ⊚ | Non | ○ | Non | ○ |
|  |  | 39 | ○ | ○ | Non | ○ | Non | ○ | — | — | — | — | — | — |
|  |  | 40 | ○ | ⊚ | Non | ○ | Non | ○ | — | — | — | — | — | — |

TABLE 6-continued

| Example Division | Invention Division | Test Piece No. | Arc Stability | Slag Covering Property | Upward Vertical Position Welding 280A Metal Running | Condition of Bead Toe portion | Slag Peeling Property | Over-All Judgement |
|---|---|---|---|---|---|---|---|---|
| Example 2 | Present Invention | 18 | ○ | ◎ | Non | ○ | ○ | Excellent |
| | | 19 | ○ | ◎ | Non | ○ | ○ | Excellent |
| | | 20 | ○ | ◎ | Non | ○ | ○ | Excellent |
| | Comparison Example | 21 | ○ | ○ | Presence | △ | △ | Inferior |
| | | 22 | ○ | △ | Presence | △ | △ | Inferior |
| | | 23 | ○ | △ | Presence | ○ | △ | Inferior |
| | | 24 | ○ | ○ | Non | ○ | ○ | Inferior |
| | | 25 | ○ | ○ | Presence | △ | ○ | Inferior |
| | | 26 | △ | ○ | Presence | △ | ○ | Inferior |
| Example 3 | Present Invention | 37 | ○ | ○ | Non | ○ | ○ | Excellent |
| | | 38 | ◎ | ◎ | Non | ○ | ○ | Excellent |
| | | 39 | ○ | ○ | Non | ○ | ○ | Excellent |
| | | 40 | ○ | ◎ | Non | ○ | ○ | Excellent |

TABLE 7

| Example Division | Invention Division | Test Piece No. | Wire Symbol | Uniformity of Thickness of Sheath Portion | | Upward Vertical Position Welding 200A | | | | |
|---|---|---|---|---|---|---|---|---|---|---|
| | | | | Minimum $T_2/T_1$ | Raw Material Biting | Arc Stability | Slag Covering Property | Metal Running | Condition of Bead Toe Portion | Slag Peeling Property |
| Example 1 | Present Invention | 27 | W27 | 0.91 | Non | ○ | ○ | Non | ○ | ○ |
| | | 28 | W28 | 0.95 | Non | ○ | ⊚ | Non | ○ | ○ |
| | Comparison Example | 29 | W29 | 0.93 | Non | ○ | Δ | Presence | Δ | ○ |
| | | 30 | W30 | 0.84 | Presence | Δ | Δ | Presence | Δ | ○ |
| Example 3 | Present Invention | 41 | W41 | 0.93 | Non | ○ | ⊚ | Non | ○ | ○ |
| | | 42 | W42 | 0.94 | Non | ⊚ | ⊚ | Non | ○ | ○ |
| | | 43 | W43 | 0.90 | Non | ○ | ○ | Non | ○ | ○ |

| Example Division | Invention Division | Test Piece No. | Wire Symbol | Upward Vertical Position Welding 280A | | | | | Over-All Judgement |
|---|---|---|---|---|---|---|---|---|---|
| | | | | Arc Stability | Slag Covering Property | Metal Running | Condition of Bead Toe Portion | Slag Peeling Property | |
| Example 1 | Present Invention | 27 | W27 | ○ | ○ | Non | ○ | ○ | Excellent |
| | | 28 | W28 | ○ | ⊚ | Non | ○ | ○ | Excellent |
| | Comparison Example | 29 | W29 | ○ | Δ | Presence | Δ | Δ | Inferior |
| | | 30 | W30 | Δ | Δ | Presence | Δ | Δ | Inferior |
| Example 3 | Present Invention | 41 | W41 | ○ | ⊚ | Non | ○ | ○ | Excellent |
| | | 42 | W42 | ⊚ | ⊚ | Non | ○ | ○ | Excellent |
| | | 43 | W43 | ○ | ○ | Non | ○ | ○ | Excellent |

The test pieces Nos. 18 to 26 were subjected to the investigation related whether or not the high electric current for the vertical position welding was available by using the wire including no Ni component. The downward vertical position welding was carried out on conditions of 280 to 310 A-welding electric current, 30 to 33 V-arc voltage, and approx. 50 to 60 cm/min-welding speed, and then the upward vertical position welding was carried out on conditions of 280 A-welding electric current, 26 to 28 V-arc voltage, and approx. 15 cm/min-welding speed, 20 to 25 mm-chip-to-base material distance, and 25 L/min-flow rate of $CO_2$ shield gas.

In Table 6, the evaluation symbols of the arc stabilizer, the slag covering properties, the condition of the bead toe portion, and the slag peeling properties designate "Excellent" with the ⊚ mark, "Good" with the ○ mark, "Inferior" with the Δ mark, and "No good" with the X mark.

The test pieces Nos. 18 to 20 (Table 6), which correspond to the flux-cored wires (W18 to W20) according to the present invention, were small in the change of the thickness of the sheath portion, and had good results, on a stable arc and slag covering condition, with no metal running and slag inclusion, with good bead shape and slag peeling properties, with possible high electric current (300 A) of the downward vertical position welding, and with satisfactory upward vertical position welding results. Contrary to this, test pieces Nos. 21 to 26 belong to the comparison samples.

The test piece No. 21 (W21) corresponds to a wire including too much $TiO_2$ component, the test piece No. 22 (W22) a wire including too much $SiO_2$ component, the test piece No. 23 (W23) a wire including small $SiO_2$ component and no $ZrO_2$ component, the test piece No. 24 (W24) a wire including too much $ZrO_2$ component and no fluoride component, the test piece No. 25 (W25) a wire including no Al and Mg component, and the test piece No. 26 (W26) a wire including too less Si—Mn ferroalloy powder (FA4) component. As shown in Table 6, these comparison examples have problems that, in the downward and the upward vertical position welding, the arc stabilization or the slag covering properties were deteriorated, the metal running, the condition of the bead toe portion, the slag inclusion, and the slag peeling properties were of no good.

The test pieces Nos. 27 to 30 (Table 7) were subjected to the investigation of the upward vertical position weldability by using the flux cored wire containing Ni component. The upward vertical position welding was carried out on conditions of 200 A and 22 to 23 V-, or 280 A and 26 to 27 V-welding electric current and arc voltage, and approx. 15 to 20 cm/min-welding speed, 20 to 25 mm-chip-to-base material distance, and 25 L/min-flow rate of $CO_2$ shield gas.

The test pieces Nos. 27 and 28, which correspond to the flux cored wires (W27 to W28) according to the present invention, were small in the change of the thickness of the sheath portion, and had good results, on a low and a high electric current welding condition, with a stable arc and slag covering condition, without no metal running, with good bead shape and slag peeling properties.

On the contrary, the test piece No. 29 (W29) corresponds to a wire including too much strong deoxidizer (Al, Mg), and the test piece No. 30 (W230) a wire including too less Si—Mn—Ni ferroalloy powder (FA9) component. As shown in Table 7, these comparison examples have problems that the arc stabilization or the slag covering properties was deteriorated, occurring the metal running, the condition of the bead toe portion and the slag peeling properties were of no good.

EXAMPLE 3

Seamless type fillet welding flux cored wires (Symbol: W31 to W36, 1.6 mm in wire diameter; Symbol: W37 to W44, 1.2 mm in wire diameter) having a wire cross sectional construction shown in FIG. 2b were prepared by filling the flux (granulation flux) while forming the mild steel-made band steels (H2) shown in Table 1 aforementioned into a tubular body, welding edges of the band steel facing each other by high frequency induction heating (approx. 22 mm in the outer diameter of the tubular body in seam welding, 10 to 30 m/min in welding speed), and continuously underwent diameter-reduction into 3.2 mm in wire diameter by a group of rollers, and underwent copper plating, and then drawing by a group of perforated dies.

Moreover, W31, W34, W35, W37, W40, W41, W44 were produced by using nonmagnetic Si—Mn ferroalloy powder (FA4, FA6, FA7) and Si—Mn—Ni ferroalloy powder (FA9, FA10), and raising heat gain of seam welding with the relative magnetic permeability ($\mu$) 1.10% or less, and with the welding speed 30 m/min. Since they include iron powder, the other wires were produced while restricting heat gain of the seam welding with the welding speed 10 to 15 m/min, which provided no cracking on the sheath. Moreover, the wires were subjected to intermediate annealing when they were drawn to 10.7 mm and 3.3 mm in wire diameter, respectively, in order to mitigate the work hardening due to the drawing and perform dehydrogenation.

Table 8 shows the details of the test wires, and Tables 6, 7, and 9 show the test results. Moreover, Table 9 shows the welding test results of the examples 3 and 4 also. A method of measuring the uniformity of the thickness of the sheath portion, a welding test condition, etc., are the same as the examples 1 and 2. Moreover, Tables 6 and 7 have been described above.

TABLE 8

| | | | | | | | Filled Flux Composition | | | | | |
| --- | --- | --- | --- | --- | --- | --- | --- | --- | --- | --- | --- | --- |
| Invention Division | Wire Symbol | Wire Division | Wire Sectional Construction | Steel-Made Sheath System | Flux Filled Ratio (%) | Flux Division | Si—Mn Ferroalloy Powder | | Mn—Ni Ferroalloy Powder | | Ferro-Silicon 42% Si | Ferro-Manganese 74% Mn | Silicon-Manganese 20% Si 62% Mn |
| | | | | | | | Symbol | Content | Symbol | Content | | | |
| Present Invention | W31 | Fillet | FIG. 2b | H2 | 13.1 | Agglomeration | FA4 | 7.1 | — | — | — | — | — |
| | W32 | | | | 16.6 | | FA4 | 7.1 | — | — | — | — | — |
| | W33 | | | | 11.8 | | FA4 | 1.9 | — | — | — | 0.6 | 2.3 |
| | W34 | | | | 16.0 | | FA4 | 11.0 | — | — | — | — | — |
| | W35 | | | | 12.6 | | — | — | FA10 | 6.6 | — | — | — |
| | W36 | | | | 15.4 | | — | — | FA10 | 6.6 | — | — | — |
| | W37 | All Position | | | 14.0 | | FA4 | 6.0 | — | — | — | — | — |
| | W38 | | | | 17.0 | | FA4 | 6.0 | — | — | — | — | — |
| | W39 | | | | 14.1 | | FA5 | 1.0 | — | — | — | — | 2.9 |
| | W40 | | | | 14.0 | | FA6 | 6.0 | — | — | — | — | — |
| | W41 | | | | 12.9 | | — | — | FA9 | 5.5 | — | — | — |
| | W42 | | | | 15.4 | | — | — | FA9 | 5.5 | — | — | — |
| | W43 | | | | 12.1 | | — | — | FA10 | 1.1 | 0.1 | 2.0 | — |
| Comparison Example | W44 | | | | 14.0 | | FA7 | 6.0 | — | — | — | — | — |

| | | | | | | | Filled Flex Composition | | | | | | |
| --- | --- | --- | --- | --- | --- | --- | --- | --- | --- | --- | --- | --- | --- |
| Invention Division | Wire Symbol | Wire Division | Wire Sectional Construction | Steel-Made Sheath System | Flux Filled Ratio (%) | Flux Division | TiO$_2$ | SiO$_2$ | ZrO$_2$ | Al$_2$O$_2$ | MgO$_2$ | Iron Oxide | Fluoride |
| Present Invention | W31 | Fillet | FIG. 2b | H2 | 13.1 | Agglomeration | 3.1 | 0.3 | 0.8 | 0.3 | — | 0.3 | 0.2 |
| | W32 | | | | 16.6 | | 3.1 | 0.3 | 0.8 | 0.3 | — | 0.3 | 0.2 |
| | W33 | | | | 11.8 | | 2.8 | 0.6 | 0.1 | 0.3 | 0.3 | 0.2 | 0.2 |
| | W34 | | | | 16.0 | | 3.1 | 0.2 | 0.6 | 0.2 | — | — | 0.1 |
| | W35 | | | | 12.6 | | 3.1 | 0.3 | 0.8 | 0.3 | — | 0.3 | 0.2 |
| | W36 | | | | 15.4 | | 3.1 | 0.3 | 0.8 | 0.3 | — | 0.3 | 0.2 |
| | W37 | All Position | | | 14.0 | | 5.5 | 0.7 | 0.5 | — | — | — | 0.06 |
| | W38 | | | | 17.0 | | 5.5 | 0.7 | 0.5 | — | — | — | 0.06 |
| | W39 | | | | 14.1 | | 5.5 | 0.7 | 0.5 | — | — | — | 0.06 |
| | W40 | | | | 14.0 | | 5.5 | 0.7 | 0.5 | — | — | — | 0.06 |
| | W41 | | | | 12.9 | | 5.0 | 0.4 | 0.6 | — | — | — | 0.06 |
| | W42 | | | | 15.4 | | 5.0 | 0.4 | 0.6 | — | — | — | 0.06 |
| | W43 | | | | 12.1 | | 5.0 | 0.4 | 0.6 | — | — | — | 0.06 |
| Comparison Example | W44 | | | | 14.0 | | 5.5 | 0.7 | 0.5 | — | — | — | 0.06 |

| | | | | | | | Filled Flex Composition | | | | | | |
| --- | --- | --- | --- | --- | --- | --- | --- | --- | --- | --- | --- | --- | --- |
| Invention Division | Wire Symbol | Wire Division | Wire Sectional Construction | Steel-Made Sheath System | Flux Filled Ratio (%) | Flux Division | Fluoride (F-conveerted Value) | Al | Mg | Iron Powder | Arc Stability | Hydrogen Content of Wire (%) | Nitrogen Content of Wire (%) |
| Present Invention | W31 | Fillet | FIG. 2b | H2 | 13.1 | Agglomeration | 0.10 | — | 0.2 | — | 0.8 | 0.003 | 0.005 |
| | W32 | | | | 16.6 | | 0.10 | — | 0.2 | 3.5 | 0.8 | 0.003 | 0.005 |
| | W33 | | | | 11.8 | | 0.10 | — | 0.2 | 1.5 | 0.8 | 0.003 | 0.005 |
| | W34 | | | | 16.0 | | 0.05 | — | — | — | 0.8 | 0.003 | 0.006 |
| | W35 | | | | 12.6 | | 0.10 | — | 0.2 | — | 0.8 | 0.003 | 0.003 |
| | W36 | | | | 15.4 | | 0.10 | — | 0.2 | 2.8 | 0.8 | 0.003 | 0.003 |

TABLE 8-continued

|   |   |   |   |   |   |   |   |   |   |
|---|---|---|---|---|---|---|---|---|---|
|  | W37 | All | 14.0 | 0.03 | 0.3 | 0.3 | — | 0.6 | 0.003 | 0.005 |
|  | W38 | Position | 17.0 | 0.03 | 0.3 | 0.3 | 3.0 | 0.6 | 0.003 | 0.005 |
|  | W39 |  | 14.1 | 0.03 | 0.3 | 0.3 | 2.2 | 0.6 | 0.003 | 0.005 |
|  | W40 |  | 14.0 | 0.03 | 0.3 | 0.3 | — | 0.6 | 0.003 | 0.008 |
|  | W41 |  | 12.9 | 0.04 | 0.2 | 0.5 | — | 0.6 | 0.003 | 0.003 |
|  | W42 |  | 15.4 | 0.04 | 0.2 | 0.5 | 2.5 | 0.6 | 0.003 | 0.003 |
|  | W43 |  | 12.1 | 0.04 | 0.2 | 0.5 | 1.5 | 0.6 | 0.003 | 0.003 |
| Comparison Example | W44 |  | 14.0 | 0.03 | 0.3 | 0.3 | — | 0.6 | 0.003 | 0.011 |

Remarks:
(1) Fluoride: Potassium silico-fluoride
(2) Arc stabilizer: Potassium feldspar, Sodium titanate, Water glass solid material (Potassium silicate)

TABLE 9

| Example Division | Invention Division | Test Piece No. | Wire Symbol | Uniformity of Thickness Sheath Portion Minimum $T_2/T_1$ | Raw Material Biting | Arc Stability | Slag Covering Property | Pit (Number/m) | Worm Hole (Concurrence %) | Evaluation |
|---|---|---|---|---|---|---|---|---|---|---|
| Example 3 | Present Invention | 31 | W31 | 0.94 | Non | ○ | ⊙ | 0 | 0 | ⊙ |
|  |  | 32 | W32 | 0.96 | Non | ⊙ | ⊙ | 0 | 0 | ⊙ |
|  |  | 33 | W33 | 0.90 | Non | ○ | ○ | 2 | 0 | ○ |
|  |  | 34 | W34 | 0.96 | Non | ⊙ | ⊙ | 0 | 0 | ⊙ |
|  |  | 35 | W35 | 0.94 | Non | ○ | ⊙ | 0 | 0 | ⊙ |
|  |  | 36 | W36 | 0.93 | Non | ⊙ | ⊙ | 0 | 0 | ⊙ |
| Example 4 | Present Invention | 45 | W45 | 0.92 | Non | ○ | ○ | 2 | 0 | ○ |
|  |  | 46 | W46 | 0.92 | Non | ⊙ | ○ | 0 | 0 | ⊙ |
|  | Comparison Example | 47 | W47 | 0.91 | Non | ○ | ○ | 19 | 20 | X |

| Example Division | Invention Division | Test Piece No. | Wire Symbol | Evaluation for Space | Slag Seizure | Remarks | Evaluation | Slag Peeling Property | Over-All Judgement |
|---|---|---|---|---|---|---|---|---|---|
| Example 3 | Present Invention | 31 | W31 | ○ | ○ | — | ○ | ○ | Excellent |
|  |  | 32 | W32 | ⊙ | ○ | — | ○ | ○ | Excellent |
|  |  | 33 | W33 | ○ | ○ | — | ○ | ○ | Excellent |
|  |  | 34 | W34 | ⊙ | ○ | — | ○ | ○ | Excellent |
|  |  | 35 | W35 | ○ | ○ | — | ○ | ○ | Excellent |
|  |  | 36 | W36 | ⊙ | ○ | — | ○ | ○ | Excellent |
| Example 4 | Present Invention | 45 | W45 | ○ | ○ | — | ○ | ○ | Excellent |
|  |  | 46 | W46 | ○ | ○ | — | ○ | ○ | Excellent |
|  | Comparison Example | 47 | W47 | ○ | ○ | *1 | ○ | ○ | Inferior |

(Remarks)
*1: Remarkable pit and worm holes

The test piece Nos. 31 to 36 (Table 9) were prepared by using the fillet welding flux wires (W31 to W36) according to the present invention. Any of them was good in the resistance to primer, the shape and the appearance of the bead, and the slag peeling properties. In particular, the test pieces Nos. 32, 34, 36 corresponding, respectively, to the W32 and the W36 including iron powder, and the W34 including Si—Mn ferroalloy powder (FA4) in large quantities are good in the resistance to primer, the shape and the appearance of the bead, and the slag peeling properties, in a remarkably stable arc and slag covering condition.

The test piece Nos. 37 to 43 (Tables 6 and 7) were prepared by using the all position welding flux wires (W37 to W43) according to the present invention. These test pieces are capable of raising the electric current for the downward vertical position welding, and enlarging the condition range of the upward vertical position welding.

EXAMPLE 4

The flux cored wires (Symbol: W45 to W47, 1.6 mm in wire) were prepared by forming the mild steel-made band steel (H1) shown in Table 1 into a U, filling the flux (unagglomerated flux) in a groove of the formed band steel, butting both edges of the band steel into a tubular body, and further drawing the tubular body by a group of rollers and a group of perforated dies. There was used Si—Mn ferroalloy powder (FA2) shown in Table 2. Table 10 shows the details of the test wire, and Table 9 shows test results of the test wire. Moreover, Tables 2 and 9 have been described above.

TABLE 10

(Ratio to Wire Total Weight: Weight %)

Figure 2C:
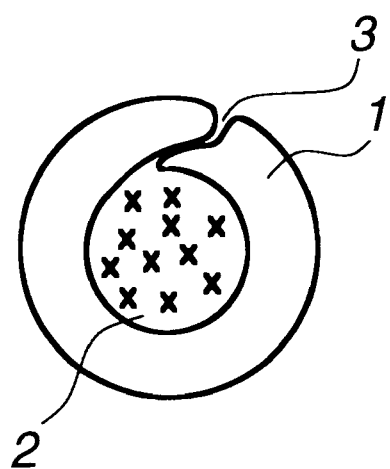
Figure 2D:
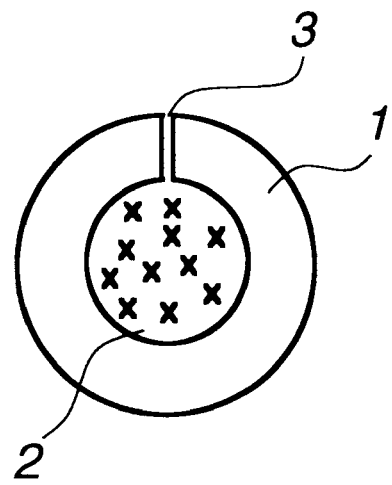

| Invention Division | Wire Symbol | Wire Division | Wire Sectional Construction | Steel-Made Sheath System | Flux Filled Ratio (%) | Flux Division | Filled Flux Composition | | | | | |
|---|---|---|---|---|---|---|---|---|---|---|---|---|
| | | | | | | | Si—Mn Ferroalloy Powder | | Ferro-Manganese | Silicon-Manganese 20% Si | | | |
| | | | | | | | Symbol | Content | 74% Mn | 62% Mn | TiO$_2$ | SiO$_2$ | ZrO$_2$ |
| Present Invention | W45 | Fillet | FIG. 2c | H1 | 12.4 | Un-agglom-eration | FA2 | 4.0 | 1.6 | 1.1 | 3.4 | 0.3 | 0.4 |
| | W46 | | | | 20.4 | | FA2 | 4.0 | 1.6 | 1.1 | 3.4 | 0.3 | 0.4 |
| Comparison Example | W47 | | | | 12.4 | | FA2 | 4.0 | 1.6 | 1.1 | 3.4 | 0.3 | 0.4 |

| Invention Division | Wire Symbol | Wire Division | Wire Sectional Construction | Steel-Made Sheath System | Flux Filled Ratio (%) | Flux Division | Filled Flux Composition | | | | | | Arc Stability | Hydrogen Content of Wire (%) |
|---|---|---|---|---|---|---|---|---|---|---|---|---|---|---|
| | | | | | | | Al$_2$O$_3$ | Iron Oxide | Fluoride | Fluoride (F-converted value) | Mg | Iron Powder | | |
| Present Invention | W45 | Fillet | FIG. 2c | H1 | 12.4 | Un-agglom-eration | 0.3 | 0.2 | 0.1 | 0.05 | 0.2 | — | 0.8 | 0.006 |
| | W46 | | | | 20.4 | | 0.3 | 0.2 | 0.1 | 0.05 | 0.2 | 8.0 | 0.8 | 0.006 |
| Comparison Example | W47 | | | | 12.4 | | 0.3 | 0.2 | 0.1 | 0.05 | 0.2 | — | 0.8 | 0.009 |

Remarks:
(1) Fluoride: Potassium silico-fluoride
(2) Arc stabilizer: Potassium feldspar, Sodium titanate The test piece Nos. 45, 46 (W45, W46) were prepared by using the all position welding flux cored wires according to the present invention. These test pieces were good in the resistance to primer, the shape and the appearance of the bead, and the slag peeling properties.

Test piece No. 47 (W47) as a comparison example underwent insufficient low-hydrogen treatment in production of the wire, thereby disabling a hydrogen amount of the wire to be decreased, which provided many pits and worm holds.

EXAMPLE 4

Table 11 shows the weld metal test results of the all position flux cored wire (on the authority of JIS Z 3313). The test was carried out on the welding condition of 280A-welding electric current, 31V-arc voltage, 35 cm/min-welding speed, 25 mm-chip-to-base metal distance, 25 L/min-flow rate of CO$_2$ shield gas).

The test pieces Nos. 48, 49 (W37, W40) were prepared by using the flux-cored wires according to the present invention. These test pieces had sufficient strength and impact toughness to be required the 490 N/mm$^2$ class high strength steel. As the result, the flux-cored wire according the present invention was applied usefully to weld thee high strength steel.

Test piece No. 50 (W25) as a comparison example uses the wire including no Al and Mg component. These test pieces were increased in oxygen amount of the weld metal, and decreased in impact toughness.

Test piece No. 51 (W41) as a comparison example uses the wire having a large amount of nitrogen component. These test pieces were increased in nitrogen amount of the weld metal, and decreased in impact toughness.

While the invention has been described in detail and with reference to specific embodiments thereof, it will be apparent to those skilled in the art that various changes and modifications may be therein without departing from the spirit and scope of the invention.

What is claimed is:

TABLE 11

| Invention Division | Test Piece No. | Wire Symbol | Tension Test | | | Impact Test | | Chemical Composition (Weight %) | | | | | | |
|---|---|---|---|---|---|---|---|---|---|---|---|---|---|---|
| | | | YP (N/mm$^2$) | TS (N/mm$^2$) | E1 (%) | VE$_v$(J) | | C | Si | Mn | P | S | N | O |
| | | | | | | −20° C. | 0° C. | | | | | | | |
| Present Invention | 48 | W37 | 50.6 | 57.5 | 24 | 70 | 112 | 0.06 | 0.46 | 1.32 | 0.013 | 0.008 | 0.005 | 0.063 |
| | 49 | W40 | 52.1 | 58.2 | 24 | 48 | 75 | 0.06 | 0.47 | 1.32 | 0.013 | 0.009 | 0.008 | 0.064 |
| Comparative Example | 50 | W25 | 45.7 | 54.3 | 25 | 29 | 45 | 0.05 | 0.40 | 1.10 | 0.010 | 0.006 | 0.003 | 0.086 |
| | 51 | W41 | 54.0 | 60.4 | 24 | 18 | 30 | 0.06 | 0.46 | 1.34 | 0.013 | 0.008 | 0.012 | 0.064 |

1. A gas shielded arc-welding flux cored wire having a steel sheath filled with flux, comprising by weight % based on the total weight of wire,
  1.0% or more Si—Mn ferroalloy powder having a grain size of 212 μm or less;
  2.0 to 7.0% TiO$_2$;

0.2 to 1.5% SiO$_2$;

0.1 to 1.2% ZrO$_2$; and 0.01 to 0.3% fluoride (F-converted value), wherein
said powder comprises, by weight %, 0.40 to 1.20% C, 5 to 12% Si, 19 to 42% Mn, and the balance Fe, with the proviso that the equation Si≧11.89−2.92 C−0.077 Mn (Equation (1)) is satisfied.

2. The gas shielded arc-welding flux cored wire having a steel sheath filled with flux as in claim 1, wherein said powder has a relative magnetic permeability ($\mu$) of 1.10 or less.

3. The gas shielded arc-welding flux cored wire having a steel sheath filled with flux as in claim 1, further comprising iron powder in an amount of 10 weight % or less, based on the total weight of wire.

4. The gas shielded arc-welding flux cored wire having a steel sheath filled with flux as in claim 1, further containing a hydrogen content of 0.007 weight % or less, based on the total weight of wire.

5. The gas shielded arc-welding flux cored wire having a steel sheath filled with flux as in claim 1, further containing a nitrogen content of 0.010 weight % or less, based on the total weight of wire.

6. A gas shielded arc-welding flux cored wire having a steel sheath filled with flux, comprising by weight % based on the total weight of wire, 1.0% or more Si—Mn ferroalloy powder having a grain size of 212 $\mu$m or less;

2.0 to 7.0% of TiO$_2$;

0.2 to 1.5% of SiO$_2$;

0.1 to 1.2% of ZrO$_2$;

0.01 to 0.3% fluoride (F-converted value); and

10% or less Fe powder,
wherein said Si—Mn ferroalloy powder comprises, by weight %, 0.40 to 1.20% C, 5 to 12% Si, 19 to 42% Mn, and the balance Fe, with the proviso that the equation Si≧11.89−2.92 C−0.077 Mn (Equation (1)) is satisfied, and has a relative permeability of 1:10 or less.

7. A gas shielded arc-welding flux cored wire for fillet welding having a steel sheath filled with flux, comprising by weight % based on the total weight of wire, 1.0% or more Si—Mn ferroalloy powder having a grain size of 212 $\mu$m or less;

2.0 to 5.0% of TiO$_2$;

0.2 to 1.2% of SiO$_2$;

0.1 to 1.2% of ZrO$_2$; and 0.01 to 0.3% fluoride (F-converted value);

said powder comprising, by weight %, 0.40 to 1.20% C, 5 to 12% Si, 19 to 42% Mn, and the balance Fe, with the proviso that the equation Si≧11.89−2.92 C−0.077 Mn (Equation (1)) is satisfied.

8. A gas shielded arc-welding flux cored wire for fillet welding having a steel sheath filled with flux, comprising by weight % based on the total weight of wire, 1.0% or more Si—Mn—Ni ferroalloy powder having a grain size of 212 $\mu$m or less;

2.0 to 5.0% of TiO$_2$;

0.2 to 1.2% of SiO$_2$;

0.1 to 1.2% of ZrO$_2$; and 0.01 to 0.3% fluoride (F-converted value);

said powder comprising by weight %, 0.40 to 1.20% C, 5 to 12% Si, 19 to 42% Mn, 30% or less Ni, and the balance Fe, with the proviso that the equation Si≧11.89−2.92 C−0.077 Mn−0.062Ni (Equation (2)) is satisfied.

9. The gas shielded arc-welding flux cored wire for fillet welding having a steel sheath filled with flux as in claim 8, wherein said powder has a relative magnetic permeability ($\mu$) of 1.10 or less.

10. The gas shielded arc-welding flux cored wire for fillet welding having a steel sheath filled with flux as in claim 8, further comprising iron powder in an amount of 10 weight % or less, based on the total weight of wire.

11. The gas shielded arc-welding flux cored wire for fillet welding having a steel sheath filled with flux as in claim 8, further containing a hydrogen content of 0.007 weight % or less, based on the total weight of wire.

12. The gas shielded arc-welding flux cored wire for fillet welding having a steel sheath filled with flux as in claim 8, further containing a nitrogen content of 0.010 weight % or less, based on the total weight of wire.

13. A gas shielded arc-welding flux cored wire for fillet welding having a steel sheath filled with flux, comprising by weight % based on the total weight of wire, 1.0% or more Si—Mn—Ni ferroalloy powder having a grain size of 212 $\mu$m or less;

2.0 to 5.0% of TiO$_2$;

0.2 to 1.2% of SiO$_2$;

0.1 to 1.2% of ZrO$_2$;

0.01 to 0.3% fluoride (F-converted value); and

10% or less Fe powder; wherein
said Si—Mn—Ni powder comprises, by weight %, 0.40 to 1.20% C, 5 to 12% Si, 19 to 42% Mn, 30% or less Ni, and the balance Fe, with the proviso that the equation Si≧11.89−2.92 C−0.077 Mn−0.062 Ni (Equation (2)) is satisfied, and has a relative permeability ($\mu$) of 1.10 or less.

14. A gas shielded arc-welding flux cored wire for all position welding having a steel sheath filled with flux, comprising by weight % based on the total weight of wire, 1.0% or more Si—Mn ferroalloy powder having a grain size of 212 $\mu$m or less;

4.0 to 7.0% of TiO$_2$;

0.3 to 1.5% of SiO$_2$;

0.3 to 1.2% of ZrO$_2$;

0.1 to 1.5 of one or two components of Al or Mg with the proviso that the amount of Al is 1.5% or less and the amount of Mg is 0.8% of less; and 0.01 to 0.2% fluoride (F-converted value); wherein
said powder comprises, by weight %, 0.40 to 1.20% C, 5 to 12% Si, 19 to 42% Mn, and the balance Fe, with the proviso that the equation Si≧11.89−2.92 C−0.077 Mn (Equation (1)) is satisfied.

15. The gas shielded arc-welding flux cored wire for all position welding having a steel sheath filled with flux as in claim 14, wherein said powder has a relative magnetic permeability ($\mu$) of 1.10 or less.

16. The gas shielded arc-welding flux cored wire for all position welding having a steel sheath filled with flux as in claim 14, further comprising an iron powder in an amount of 10 weight % or less, based on the total weight of wire.

17. The gas shielded arc-welding flux cored wire for all position welding having a steel sheath filled with flux as in claim 14, further containing a hydrogen content of 0.007 weight % or less, based on the total weight of wire.

18. The gas shielded arc-welding flux cored wire for all position welding having a steel sheath filled with flux as in claim 14, further containing a nitrogen content of 0.010 weight % or less, based on the total weight of wire.

19. A gas shielded arc-welding flux cored wire for all position welding having a steel sheath filled with flux, comprising by weight % based on the total weight of wire, 1.0% or more Si—Mn ferroalloy powder having a grain size of 212 μm or less;

4.0 to 7.0% of $TiO_2$;

0.3 to 1.5% of $SiO_2$;

0.3 to 1.2% of $ZrO_2$;

0.1 to 1.5% of one or two components of Al or Mg with the proviso that the amount of Al is 1.5% or less and the amount of Mg is 0.8% of less;

0.01 to 0.2% fluoride (F-converted value); and

10% or less Fe powder; wherein said Si—Mn ferroalloy powder comprises, by weight %, 0.40 to 1.20% C, 5 to 12% Si, 19 to 42% Mn, and the balance Fe, with the proviso that the equation $Si \geq 11.89 - 2.92 \, C - 0.077 \, Mn$ (Equation (1)) is satisfied, and has a relative permeability ($\mu$) of 1.10 or less.

20. A gas shielded arc-welding flux cored wire for all position welding having a steel sheath filled with flux, comprising by weight % based on the total weight of wire, 1.0% or more Si—Mn—Ni ferroalloy powder having a grain size of 212 μm or less;

4.0 to 7.0% of $TiO_2$;

0.3 to 1.5% of $SiO_2$;

0.3 to 1.2% of $ZrO_2$;

0.1 to 1.5% of one or two components of Al or Mg with the proviso that the amount of Al is 1.5% or less and the amount of Mg is 0.8% or less; and 0.01 to 0.3% fluoride (F-converted value), wherein said powder comprises, by weight %, 0.40 to 1.20% C, 5 to 12% Si, 19 to 42% Mn, 30% or less Ni, and the balance Fe, with the proviso that the equation $Si \geq 11.89 - 2.92 \, C - 0.077 \, Mn - 0.062 \, Ni$ (Equation (2)) is satisfied.

21. The gas shielded arc-welding flux cored wire for all position welding having a steel sheath filled with flux as in claim 20, wherein the powder has a relative magnetic permeability ($\mu$) of 1.10 or less.

22. The gas shielded arc-welding flux cored wire for all position welding having a steel sheath filled with flux as in claim 20, further comprising iron powder in an amount of 10% or less, based on the total weight of the wire.

23. The gas shielded arc-welding flux cored wire for all position welding having a steel sheath filled with flux as in claim 20, further containing a hydrogen content of 0.007 weight % or less, based on the total weight of wire.

24. The gas shielded arc-welding flux cored wire for all position welding having a steel sheath filled with flux as in claim 20, further containing a nitrogen content of 0.010 weight % or less, based on the total weight of wire.

25. A gas shielded arc-welding flux cored wire for all position welding having a steel sheath filled with flux, comprising by weight % based on the total weight of wire, 1.0% or more Si—Mn—Ni ferroalloy powder having a grain size of 212 μm or less;

4.0 to 7.0% of $TiO_2$;

0.3 to 1.5% of $SiO_2$;

0.3 to 1.2% of $ZrO_2$;

0.1 to 1.5% of one or two components of Al or Mg with the proviso that the amount of Al is 1.5% or less and the amount of Mg is 0.8% or less;

0.01 to 0.3% fluoride (F-converted value); and

10% or less Fe powder, wherein said Si—Mn—Ni ferroalloy powder comprises, by weight %, 0.40 to 1.20% C, 5 to 12% Si, 19 to 42% Mn, 30% or less Ni, and the balance Fe, with the proviso that the equation $Si \geq 11.89 - 2.92 \, C - 0.077 \, Mn - 0.062 \, Ni$ (Equation (2)) is satisfied, and has a relative permeability ($\mu$) of 1.10 or less.

* * * * *